(12) United States Patent
Yang et al.

(10) Patent No.: US 12,262,369 B2
(45) Date of Patent: Mar. 25, 2025

(54) MULTIPLEXING UPLINK CONTROL INFORMATION (UCI) ON AN UPLINK DATA TRANSMISSION HAVING MULTIPLE TRANSPORT BLOCKS

(71) Applicant: QUALCOMM Incorporated, San Diego, CA (US)

(72) Inventors: Wei Yang, San Diego, CA (US); Yu Zhang, San Diego, CA (US); Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 17/700,156

(22) Filed: Mar. 21, 2022

(65) Prior Publication Data
US 2023/0300823 A1   Sep. 21, 2023

(51) Int. Cl.
| | |
|---|---|
| *H04W 72/1263* | (2023.01) |
| *H04L 1/00* | (2006.01) |
| *H04W 72/20* | (2023.01) |
| *H04W 72/23* | (2023.01) |
| *H04W 72/566* | (2023.01) |

(52) U.S. Cl.
CPC ....... *H04W 72/1263* (2013.01); *H04L 1/0003* (2013.01); *H04W 72/20* (2023.01); *H04W 72/23* (2023.01); *H04W 72/569* (2023.01)

(58) Field of Classification Search
CPC ..... H04W 72/20; H04W 72/21; H04W 72/23; H04W 72/231; H04W 72/232; H04W 72/1263; H04W 72/1268; H04W 72/1273; H04W 72/569; H04W 72/044; H04W 72/0446; H04W 72/0453; H04L 1/1854; H04L 1/1887; H04L 1/0003;
(Continued)

(56) References Cited

U.S. PATENT DOCUMENTS

2018/0199314 A1   7/2018 Takeda et al.
2019/0081737 A1*  3/2019 Huang ................. H04L 1/1671
(Continued)

FOREIGN PATENT DOCUMENTS

| WO | 2021233292 A1 | 11/2021 |
| WO | 2022029335 A1 | 2/2022 |
| WO | 2023025086 A1 | 3/2023 |

OTHER PUBLICATIONS

International Search Report and Written Opinion—PCT/US2023/063138—ISA/EPO—Jun. 20, 2023.

*Primary Examiner* — Peter Chen
(74) *Attorney, Agent, or Firm* — Shumaker & Sieffert

(57) ABSTRACT

Techniques related to multiplexing uplink control information (UCI) onto a multi-transport block (TB) physical uplink shared channel (PUSCH) transmission are disclosed. Some aspects of the disclosure relate to devices and methods for wireless communication where a user equipment (UE) receives an uplink grant for a PUSCH transmission having a plurality of TBs, each being associated with a respective TB priority index. The UE then transmits the PUSCH including the plurality of TBs. The UE may further transmit a plurality of UCIs multiplexed with the PUSCH, where each UCI is associated with a respective UCI priority index. Other aspects, embodiments, and features are also claimed and described.

30 Claims, 17 Drawing Sheets

(58) Field of Classification Search
CPC ... H04L 5/0053; H04L 5/0055; H04L 5/0057; H04L 5/0094; H04L 5/001
See application file for complete search history.

(56) References Cited

U.S. PATENT DOCUMENTS

| | | |
|---|---|---|
| 2021/0307070 A1 | 9/2021 | Kim et al. |
| 2023/0291510 A1* | 9/2023 | Singh .................... H04L 1/1887 |
| 2023/0345471 A1* | 10/2023 | Seok ................ H04W 72/1268 |

* cited by examiner

MULTIPLEXING UPLINK CONTROL INFORMATION (UCI) ON AN UPLINK DATA TRANSMISSION HAVING MULTIPLE TRANSPORT BLOCKS

TECHNICAL FIELD

The technology discussed below relates generally to wireless communication systems, and more particularly, to multiplexing uplink control information (UCI) on an uplink data transmission having multiple transport blocks.

INTRODUCTION

A transport block (TB) is a packet or block of information carried on a transport channel between the MAC and physical layers of a communication network. As commonly used in modern wireless communication networks, one or more transport blocks may be carried in a scheduled transmission. At the physical layer, user data corresponding to transport blocks is commonly separated from control information, which is carried on a physical control channel. However, in some cases control information can be piggybacked, or multiplexed onto a transport block.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later. While some examples may be discussed as including certain aspects or features, all discussed examples may include any of the discussed features. And unless expressly described, no one aspect or feature is essential to achieve technical effects or solutions discussed herein.

In one example a method for wireless communication is disclosed. The method includes receiving an uplink (UL) grant that includes a grant for a physical uplink shared channel (PUSCH) transmission. The PUSCH transmission includes a plurality of transport blocks (TBs), each respective TB of the plurality of TBs being associated with a respective TB priority index. The method further includes transmitting the PUSCH including the plurality of TBs.

In another example another method of wireless communication is disclosed. The method includes transmitting an uplink (UL) grant that includes a grant for a physical uplink shared channel (PUSCH) transmission. The PUSCH transmission includes a plurality of transport blocks (TBs), each respective TB of the plurality of TBs being associated with a respective TB priority index. The method further includes receiving the PUSCH including the plurality of TBs.

In another example an apparatus for wireless communication is disclosed. The apparatus includes a processor, a memory, and a transceiver coupled to the processor. The processor is coupled to the memory and is configured to receive, via the transceiver, an uplink (UL) grant that includes a grant for a physical uplink shared channel (PUSCH) transmission. The PUSCH transmission includes a plurality of transport blocks (TBs), each respective TB of the plurality of TBs being associated with a respective TB priority index. The processor is further configured to transmit, via the transceiver, the PUSCH including the plurality of TBs.

In another example another apparatus for wireless communication is disclosed. The apparatus includes a processor, a memory, and a transceiver coupled to the processor. The processor is coupled to the memory and is configured to transmit, via the transceiver, an uplink (UL) grant that includes a grant for a physical uplink shared channel (PUSCH) transmission. The PUSCH transmission includes a plurality of transport blocks (TBs), each respective TB of the plurality of TBs being associated with a respective TB priority index. The processor is further configured to receive, via the transceiver, the PUSCH including the plurality of TBs.

These and other aspects of the technology discussed herein will become more fully understood upon a review of the detailed description, which follows. Other aspects and features will become apparent to those of ordinary skill in the art, upon reviewing the following description of specific examples in conjunction with the accompanying figures. While the following description may discuss various advantages and features relative to certain examples, implementations, and figures, all examples can include one or more of the advantageous features discussed herein. In other words, while this description may discuss one or more examples as having certain advantageous features, one or more of such features may also be used in accordance with the other various examples discussed herein. In similar fashion, while this description may discuss certain examples as devices, systems, or methods, it should be understood that such examples of the teachings of the disclosure can be implemented in various devices, systems, and methods.

DETAILED DESCRIPTION

In a wireless communication network, an uplink shared channel transmission may carry multiple transport blocks (TBs). And further, such an uplink shared channel transmission may carry multiple uplink control information (UCIs). In various aspects, the present disclosure provides methods and devices for piggybacking or multiplexing UCIs on the multi-TB uplink shared channel transmission. By taking advantage of aspects described herein, a wireless communication network may achieve higher data rates, improved network capacity, and/or improved spectral efficiency by multiplexing UCIs onto a multi-TB uplink shared channel transmission.

Figure 1:
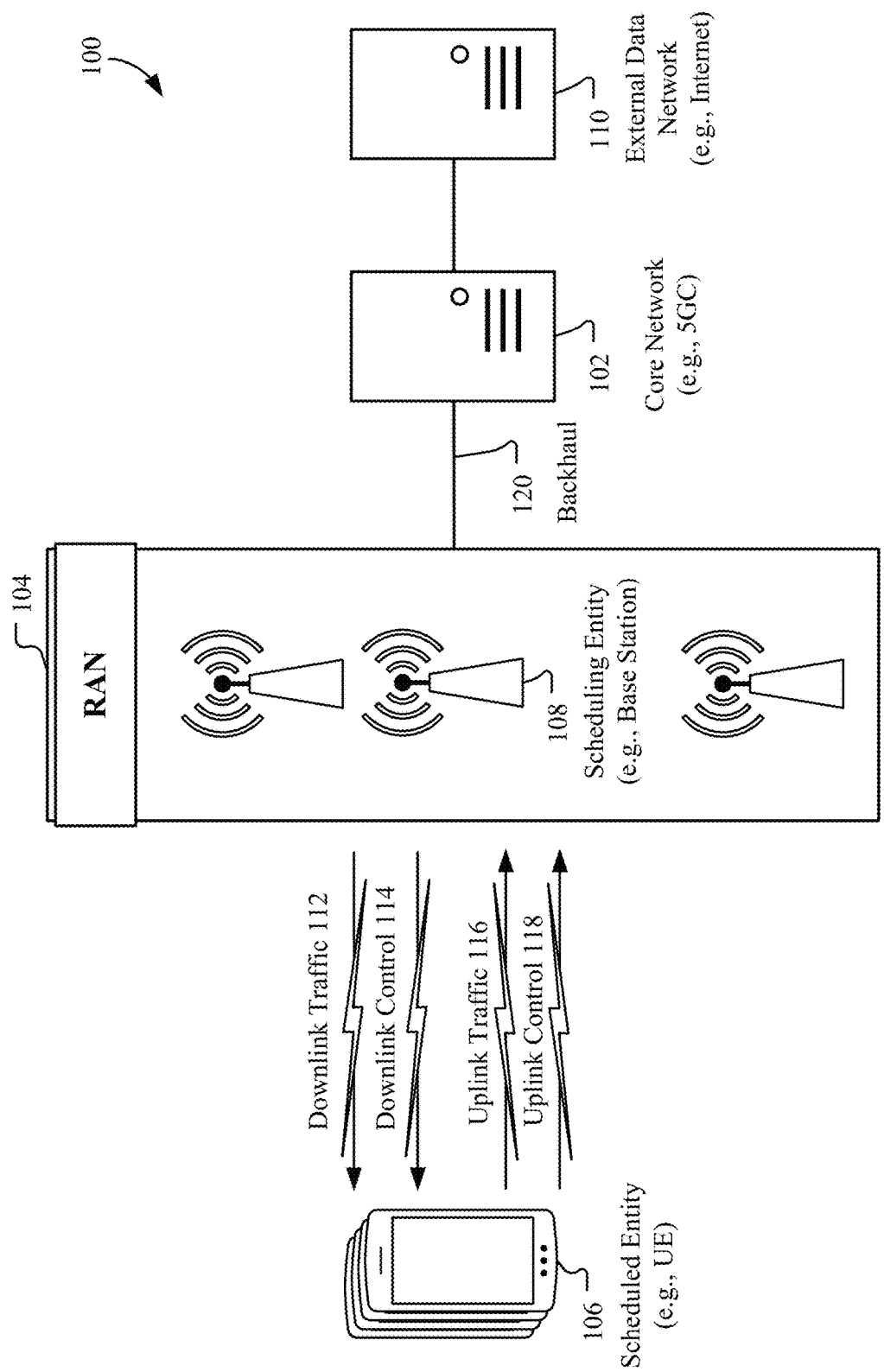
FIG. 1 is a schematic illustration of a wireless communication system according to some aspects of this disclosure.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a "base station" as a base transceiver station (BTS), a radio base station, a radio transceiver, a transceiver function, a basic service set (BSS), an extended service set (ESS), an access point (AP), a Node B (NB), an evolved Node B (eNB), a gNode B (gNB), a 5G NB, a transmit receive point (TRP), or some other suitable terminology.

The radio access network (RAN) 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; and agricultural equipment; etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data. A mobile apparatus may additionally include two or more disaggregated devices in communication with one another, including, for example, a wearable device, a haptic sensor, a limb movement sensor, an eye movement sensor, etc., paired with a smartphone. In various examples, such disaggregated devices may communicate directly with one another over any suitable communication channel or interface or may indirectly communicate with one another over a network (e.g., a local area network or LAN).

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., network node 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a network node 108) allocates resources for communication among some or all devices and equipment within its service area or cell. Within the present disclosure, as discussed further below, a scheduling entity may be responsible for scheduling, assigning, reconfiguring, and releasing resources for one or more scheduled entities. That is, for scheduled communication, UEs 106, which may be scheduled entities, may utilize resources allocated by a scheduling entity 108.

Base stations are not the only entities that may function as scheduling entities. That is, in some examples, a UE or network node may function as a scheduling entity, scheduling resources for one or more scheduled entities (e.g., one or more UEs).

As illustrated in FIG. 1, a network node 108 may broadcast downlink traffic 112 to one or more UEs 106. Broadly, the network node 108 is a node or device responsible for scheduling traffic in a wireless communication network, including downlink traffic 112 and, in some examples, uplink traffic 116 from one or more UEs 106 to the network node 108. On the other hand, the UE 106 is a node or device that receives downlink control information 114, including but not limited to scheduling information (e.g., a grant), synchronization or timing information, or other control information from another entity in the wireless communication network such as the network node 108.

In general, network nodes 108 may include a backhaul interface for communication with a backhaul portion 120 of the wireless communication system. The backhaul 120 may provide a link between a network node 108 and the core network 102. Further, in some examples, a backhaul network may provide interconnection between the respective network nodes 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
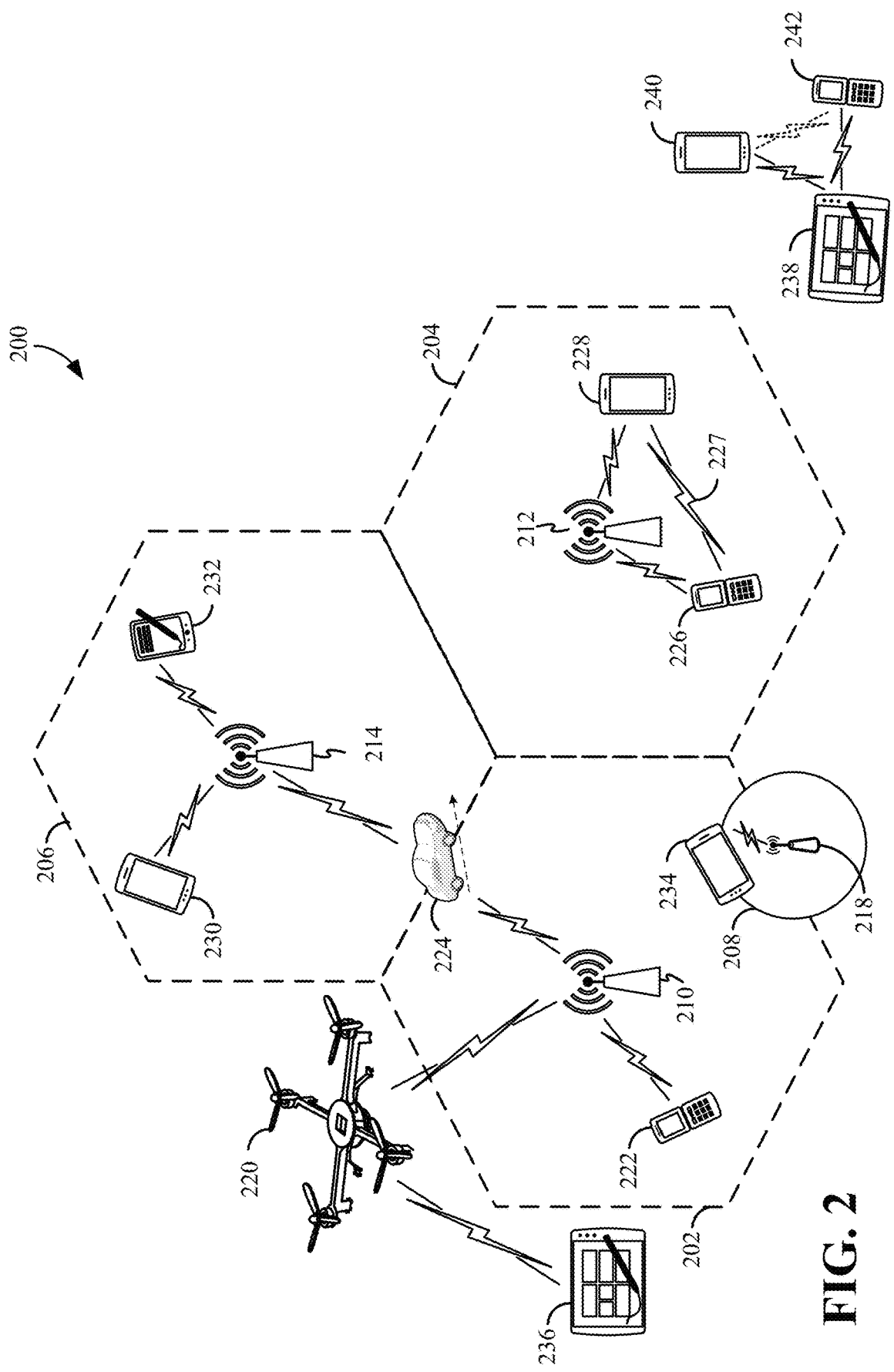
FIG. 2 is a schematic illustration of an example of a radio access network according to some aspects of this disclosure.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point, base station, or network node. FIG. 2 illustrates macrocells 202, 204, and 206, and a small cell 208.

FIG. 2 shows two three network nodes 210, and 212, and 214 in cells 202, 204, and 206. In the illustrated example, the cells 202, 204, and 206 may be referred to as macrocells, as the network nodes 210, 212, and 214 support cells having a large size. Further, a network node 218 is shown in the small cell 208 (e.g., a microcell, picocell, femtocell, home base station, home Node B, home eNode B, etc.) which may overlap with one or more macrocells. In this example, the cell 208 may be referred to as a small cell, as the network node 218 supports a cell having a relatively small size. Cell sizing can be done according to system design as well as component constraints.

The RAN 200 may include any number of wireless network nodes and cells. Further, a RAN may include a relay node to extend the size or coverage area of a given cell. The network nodes 210, 212, 214, 218 provide wireless access points to a core network for any number of mobile apparatuses. In some examples, the network nodes 210, 212, 214, and/or 218 may be the same as the base station/scheduling entity 108 described above and illustrated in FIG. 1.

FIG. 2 further includes a quadcopter or drone 220, which may be configured to function as a network node. That is, in some examples, a cell may not necessarily be stationary, and the geographic area of the cell may move according to the location of a mobile network node such as the quadcopter 220.

Within the RAN 200, each network node 210, 212, 214, 218, and 220 may be configured to provide an access point to a core network 102 (see FIG. 1) for all the UEs in the respective cells. For example, UEs 222 and 224 may be in communication with network node 210; UEs 226 and 228 may be in communication with network node 212; UEs 230 and 232 may be in communication with network node 214; UE 234 may be in communication with network node 218; and UE 236 may be in communication with mobile network node 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with network node 210.

In a further aspect of the RAN 200, sidelink signals may be used between UEs without necessarily relying on scheduling or control information from a network node (e.g., a scheduling entity). For example, two or more UEs (e.g., UEs 226 and 228) may communicate with each other using peer to peer (P2P) or sidelink signals 227 without relaying that communication through a network node. In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS 108 (such as a Node B (NB), evolved NB (eNB), NR BS, 5G NB, gNB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
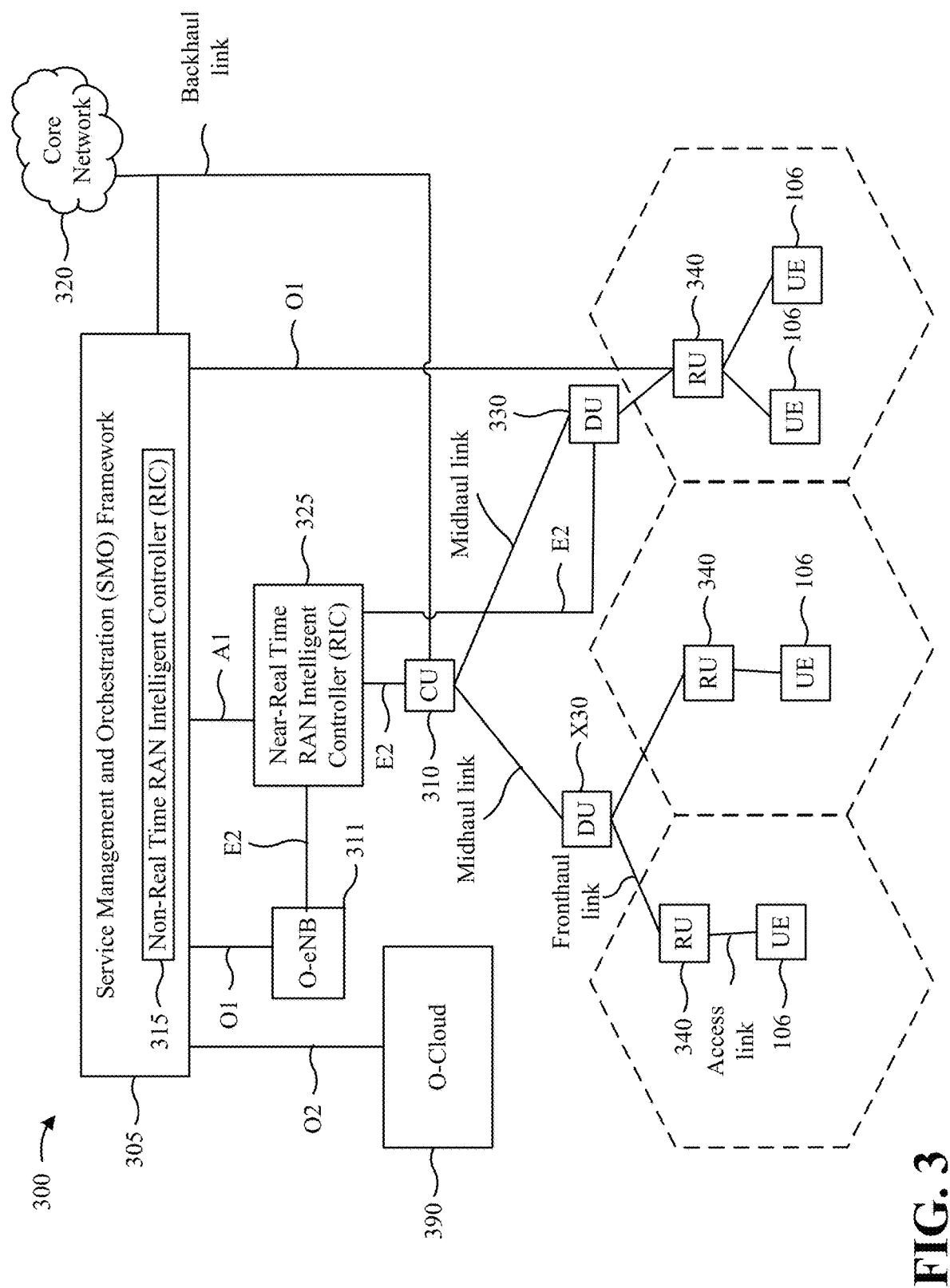
FIG. 3 is a schematic illustration of an example of a disaggregated base station architecture according to some aspects of this disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 106 via one or more radio frequency (RF) access links. In some implementations, the UE 106 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 106. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

In some aspects of the disclosure, a RAN node and/or UE may be configured with multiple antennas for beamforming and/or multiple-input multiple-output (MIMO) technology. The use of such multiple antenna technology enables the wireless communication system to exploit the spatial domain to support spatial multiplexing, beamforming, and transmit diversity.

Beamforming generally refers to directional signal transmission or reception. For a beamformed transmission, a transmitting device may precode, or control the amplitude and phase of each antenna in an array of antennas to create a desired (e.g., directional) pattern of constructive and destructive interference in the wavefront. In a MIMO system, a transmitting device (e.g., a RAN node 108) includes multiple transmit antennas (e.g., N transmit antennas) and a receiving device (e.g., a UE 106) includes multiple receive antennas (e.g., M receive antennas). Thus, there are N×M signal paths from the transmit antennas to the receive antennas. Each of the transmitting device and the receiving device may be implemented, for example, within a scheduling entity 108, a scheduled entity 106, or any other suitable wireless communication device.

In a MIMO system, spatial multiplexing may be used to transmit multiple different streams of data, also referred to as layers, simultaneously on the same time-frequency resource. In some examples, a transmitting device may send multiple data streams to a single receiver. In this way, a MIMO system takes advantage of capacity gains and/or increased data rates associated with using multiple antennas in rich scattering environments where channel variations can be tracked. Here, the receiving device may track these channel variations and provide corresponding feedback to the transmitting device. In one example case, a rank-2 (i.e., including 2 data streams) spatial multiplexing transmission on a 2×2 MIMO antenna configuration will transmit two data streams via two transmit antennas. The signal from each transmit antenna reaches each receive antenna along a different signal path. The receiving device 106 may then reconstruct the data streams using the received signals from each receive antenna.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency and reducing the required transmission energy. This is achieved by a transmitting device 108 spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. A receiver (e.g., receiving device 106) may transmit feedback including a quantized version of the channel so that the transmitting device 108 can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

The number of data streams or layers in a MIMO or MU-MIMO (generally referred to as MIMO) system corresponds to the rank of the transmission. In general, the rank of a MIMO system is limited by the number of transmit or receive antennas, whichever is lower. In addition, the channel conditions at the receiving device 106, as well as other considerations, such as the available resources at the transmitting device 108, may also affect the transmission rank. For example, a RAN node in a RAN (e.g., transmitting device 108) may assign a rank (and therefore, a number of data streams) for a DL transmission to a particular UE (e.g., receiving device 106) based on a rank indicator (RI) the UE transmits to the RAN node. The UE may determine this RI based on the antenna configuration (e.g., the number of transmit and receive antennas) and a measured signal-to-interference-and-noise ratio (SINR) on each of the receive antennas. The RI may indicate, for example, the number of layers that the UE may support under the current channel conditions. The RAN node may use the RI along with resource information (e.g., the available resources and amount of data to be scheduled for the UE) to assign a DL transmission rank to the UE.

The transmitting device 108 determines the precoding of the transmitted data stream or streams based, e.g., on known channel state information of the channel on which the transmitting device 108 transmits the data stream(s). For example, the transmitting device 108 may transmit one or more suitable reference signals (e.g., a channel state information reference signal, or CSI-RS) that the receiving device 106 may measure. The receiving device 106 may then report measured channel quality information (CQI) back to the transmitting device 108. This CQI generally reports the current communication channel quality, and in some examples, a requested transport block size (TBS) for future transmissions to the receiver. In some examples, the receiving device 106 may further report a precoding matrix indicator (PMI) to the transmitting device 108. This PMI generally reports the receiving device's preferred precoding matrix for the transmitting device 108 to use and may be indexed to a predefined codebook. The transmitting device 108 may then utilize this CQI/PMI to determine a suitable precoding matrix for transmissions to the receiver 306.

In order for transmissions over the RAN 104 to obtain a low block error rate (BLER) while still achieving very high data rates, a transmitter may use channel coding. That is, wireless communication may generally utilize a suitable error correcting block code. In a typical block code, a transmitter splits up an information message or sequence into code blocks (CBs), and an encoder (e.g., a CODEC) at the transmitting device then mathematically adds redundancy to the information message. Exploitation of this redundancy in the encoded information message can improve the reliability of the message, enabling correction for bit errors that may occur due to the noise.

In 5G NR specifications (Release 15), data is coded in differing manners. User data (e.g., data, data traffic, traffic, etc.) may be coded using quasi-cyclic low-density parity check (LDPC) with two different base graphs. One base graph is used for large code blocks and/or high code rates, while another base graph is used otherwise. Control information and the physical broadcast channel (PBCH) may be coded using Polar coding (e.g., based on nested sequences). For the control information and the PBCH, puncturing, shortening, and repetition are used for rate matching.

Those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

In some examples, rate matching can be used to modify the size of an encoded transmission by, e.g., puncturing a portion of systematic bits. The channel coding technique, code rate, and rate matching may be referred to as a coding scheme.

Figure 4:
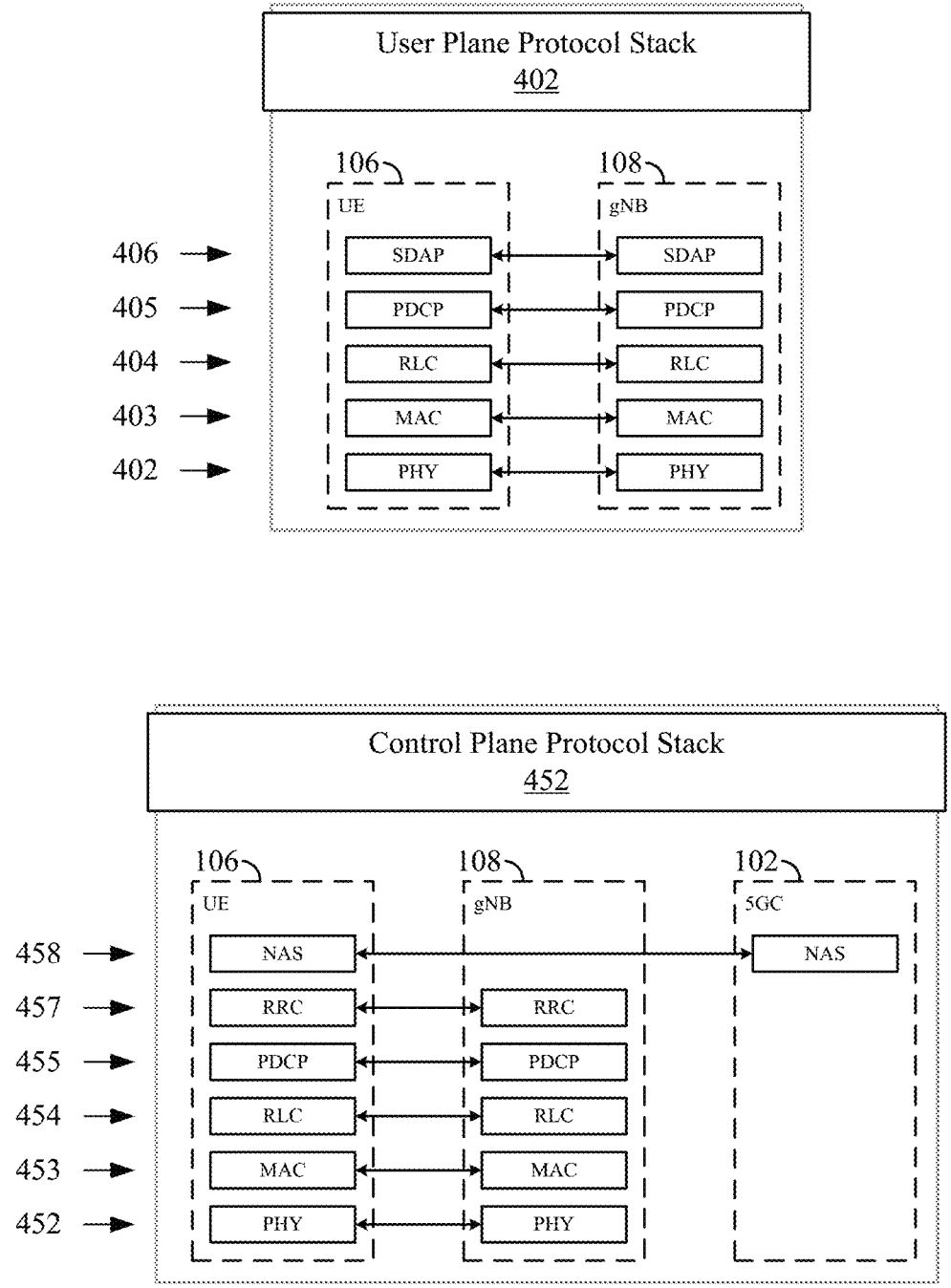
FIG. 4 is a block diagram illustrating a radio protocol architecture in a wireless communication system according to some aspects of this disclosure.

FIG. 4 is a schematic illustration of a user plane protocol stack 402 and a control plane protocol stack 452 in accordance with some aspects of this disclosure. In a wireless telecommunication system, the communication protocol architecture may take on various forms depending on the application. For example, in a 3GPP NR system, the signaling protocol stack is divided into Non-Access Stratum (NAS, 458) and Access Stratum (AS, 402-406 and 452-457) layers and protocols. The NAS protocol 458 provides upper layers, for signaling between a UE 106 and a core network 102 (referring to FIG. 1). The AS protocol 402-406 and 452-457 provides lower layers, for signaling between the RAN 104 (e.g., a gNB or other network node 108) and the UE 106.

Turning to FIG. 4, a radio protocol architecture is illustrated with a user plane protocol stack 402 and a control plane protocol stack 452, showing their respective layers or sublayers. Radio bearers between a network node 108 and a UE 106 may be categorized as data radio bearers (DRB) for carrying user plane data, corresponding to the user plane protocol 402; and signaling radio bearers (SRB) for carrying control plane data, corresponding to the control plane protocol 452.

In the AS, both the user plane 402 and control plane 452 protocols include a physical layer (PHY) 402/452, a medium access control layer (MAC) 403/453, a radio link control layer (RLC) 404/454, and a packet data convergence protocol layer (PDCP) 405/455. PHY 402/452 is the lowest layer and implements various physical layer signal processing functions. The MAC layer 403/453 provides multiplexing between logical and transport channels and is responsible for various functions. For example, the MAC layer 403/453 is responsible for reporting scheduling information, priority handling and prioritization, and error correction through hybrid automatic repeat request (HARQ) operations. The RLC layer 404/454 provides functions such as sequence numbering, segmentation and reassembly of upper layer data packets, and duplicate packet detection. The PDCP layer 405/455 provides functions including header compression for upper layer data packets to reduce radio transmission overhead, security by ciphering the data packets, and integrity protection and verification.

In the user plane protocol stack 402, a service data adaptation protocol (SDAP) layer 406 provides services and functions for maintaining a desired quality of service (QoS). And in the control plane protocol stack 452, a radio resource control (RRC) layer 457 includes a number of functional entities for routing higher layer messages, handling broadcasting and paging functions, establishing and configuring radio bearers, NAS message transfer between NAS and UE, etc. RRC signaling can provide a mechanism for configuring a UE's communication such as setting a priority index for a given transmission.

A NAS protocol layer 458 provides for a wide variety of control functions between the UE 106 and core network 102. These functions include, for example, registration management functionality, connection management functionality, and user plane connection activation and deactivation.

Figure 5:
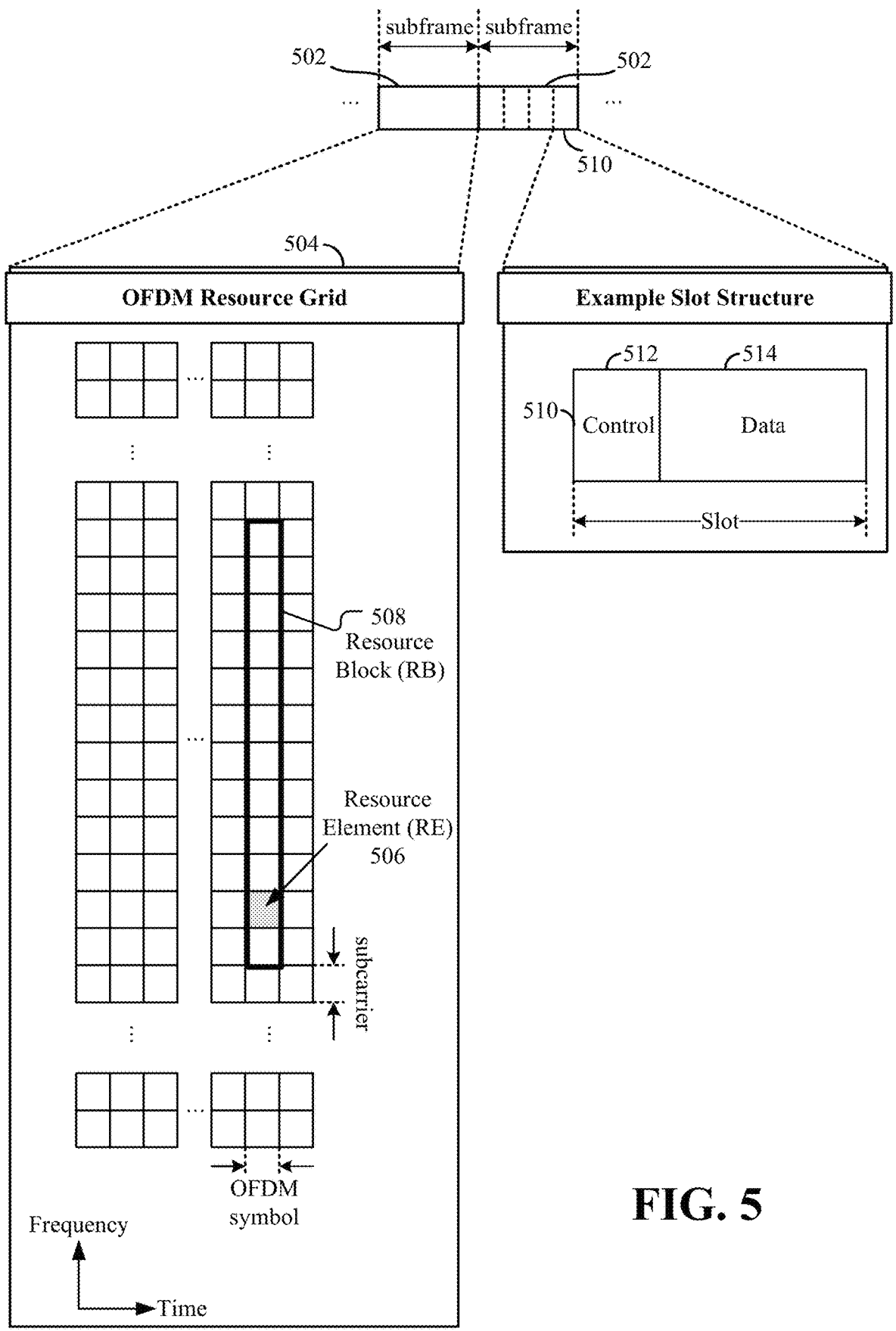
FIG. 5 is a schematic illustration of an organization of wireless resources in an air interface utilizing orthogonal frequency divisional multiplexing (OFDM) according to some aspects of this disclosure.

FIG. 5 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may include a set of subframes (e.g., 10 subframes of 1 ms each). A given carrier may include one set of frames in the UL, and another set of frames in the DL. FIG. 5 illustrates an expanded view of an exemplary DL subframe 502, showing an OFDM resource grid 504. However, as those skilled in the art will readily appreciate, the PHY transmission structure for any application may vary from the example described here, depending on any number of factors. Here, time is in the horizontal direction with units of OFDM symbols; and frequency is in the vertical direction with units of subcarriers or tones.

The resource grid 504 may schematically represent time-frequency resources for a given antenna port. That is, in a MIMO implementation with multiple antenna ports available, a corresponding multiple number of resource grids 504 may be available for communication. The resource grid 504 is divided into multiple resource elements (REs) 506. An RE, which is 1 subcarrier×1 symbol, is the smallest discrete part of the time-frequency grid and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 508, which contains any suitable number of consecutive subcarriers in the frequency domain. In one example, an RB may span 12 subcarriers, a number independent of the numerology used. In some examples, depending on the numerology, an RB may include any suitable number of consecutive OFDM symbols in the time domain.

A given UE generally utilizes only a subset of the resource grid 504. An RB may be the smallest unit of resources that a scheduler can allocate to a UE. Thus, the more RBs scheduled for a UE, and the higher the modulation scheme chosen for the air interface, the higher the data rate for the UE.

In this illustration, RB 508 occupies less than the entire bandwidth of the subframe 502, with some subcarriers illustrated above and below the RB 508. In a given implementation, subframe 502 may have a bandwidth corresponding to any number of one or more RBs 508. Further, the RB 508 is shown occupying less than the entire duration of the subframe 502, although this is merely one possible example.

Each 1 ms subframe 502 may include one or multiple adjacent slots. In FIG. 5, one subframe 502 includes four slots 510, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A network node may in some cases transmit these mini-slots occupying resources scheduled for ongoing slot transmissions for the same or for different UEs.

An expanded view of one of the slots 510 illustrates the slot 510 including a control region 512 and a data region 514. In general, the control region 512 may carry control channels (e.g., PDCCH), and the data region 514 may carry data channels (e.g., PDSCH or PUSCH). Of course, a slot may contain all DL, all UL, or at least one DL portion and at least one UL portion. The structure illustrated in FIG. 5 is merely exemplary in nature, and different slot structures may be utilized, and may include one or more of each of the control region(s) and data region(s).

Although not illustrated in FIG. 5, the various REs 506 within an RB 508 may carry one or more physical channels, including control channels, shared channels, data channels, etc. Other REs 506 within the RB 508 may also carry pilots or reference signals. These pilots or reference signals may provide for a receiving device to perform channel estimation of the corresponding channel, which may enable coherent demodulation/detection of the control and/or data channels within the RB 508.

In a DL transmission, the transmitting device (e.g., a network node 108) may allocate one or more REs 506 (e.g., within a control region 512) to carry one or more DL control channels. These DL control channels include DL control information 114 (DCI) that generally carries information originating from higher layers, such as a physical broadcast channel (PBCH), a physical downlink control channel (PDCCH), etc., to one or more UEs 106. In addition, the network node may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A network node may transmit the synchronization signals PSS and SSS (collectively referred to as SS), and in some examples, the PBCH, in an SS block that includes 4 consecutive OFDM symbols. In the frequency domain, the SS block may extend over 240 contiguous subcarriers. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize non-consecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a UE 106) may utilize one or more REs 506 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the network node 108 to schedule uplink transmissions. Here, in response to the SR transmitted on the UL control channel 118 (e.g., a PUCCH), the network node 108 may transmit downlink control information (DCI) 114 that may schedule resources for uplink packet transmissions.

UL control information (UCI) may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein a receiving device can check the integrity of packet transmissions for accuracy, e.g., utilizing any suitable integrity checking mechanism, such as a checksum or a cyclic redundancy check (CRC). If the receiving device confirms the integrity of the transmission, it may transmit an ACK, whereas if not confirmed, it may transmit a NACK. In response to a NACK, the transmitting device may send a HARQ retransmission, which may implement chase combining, incremental redundancy, etc.

As used in the present disclosure, a UCI may include a set of UL control information types, including, e.g., one or more HARQ-ACKs, one or more CSI reports, one or more scheduling requests (SR), etc. That is, a single UCI may refer to a set of multiple UCI types in a given transmission.

In some examples, a given UCI may be associated with a priority index that indicates a priority of the corresponding UCI. For example, a high-priority (HP) UCI may be associated with a priority index 1, and a low-priority (LP) UCI may be associated with a priority index 0, although this is merely one illustration and there may be any suitable number of priorities. In further examples, each UCI may be associated with a corresponding priority index. A given UCI may be associated with its priority index in any of several various methods. For example, a downlink grant for a UE to transmit HARQ-ACK feedback may explicitly inform the UE whether the HARQ-ACK feedback will be HP or LP. In other examples, a UE may be RRC configured to employ a given priority index for a given set of one or more UCIs. A priority index may in further examples be associated with a given UCI based on the type of information carried on the UCI. Other techniques for associating a priority index with a UCI may be employed as known to those of ordinary skill in the art.

In addition to control information, one or more REs 506 (e.g., within the data region 514) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In some examples, a physical layer may generally multiplex and map these physical channels described above to transport channels for handling at a medium access control (MAC) layer entity. Transport channels carry blocks of information called transport blocks (TB). The transport block size (TBS), which may correspond to a number of bits of information in a TB, may be a controlled parameter based on the modulation and coding scheme (MCS) and the number of RBs in a given transmission.

On the uplink, much like for UCIs, a given uplink data transmission via the PUSCH may be associated with a priority index. In some examples, the same priority scheme as used for UCIs may be used for PUSCH transmissions, with a high-priority (HP) PUSCH transmission being associated with a priority index 1 and a low-priority (LP) PUSCH transmission being associated with a priority index 0. Here, the priority for a PUSCH transmission may be provided on a per-grant basis, with each grant for a PUSCH transmission having an associated priority for that PUSCH transmission. A particular priority may be associated with a particular PUSCH transmission in multiple ways, including but not limited to being explicitly indicated in its corresponding grant; being configured via RRC signaling; being based on the type of data being carried on the PUSCH transmission, etc.

Figure 6:
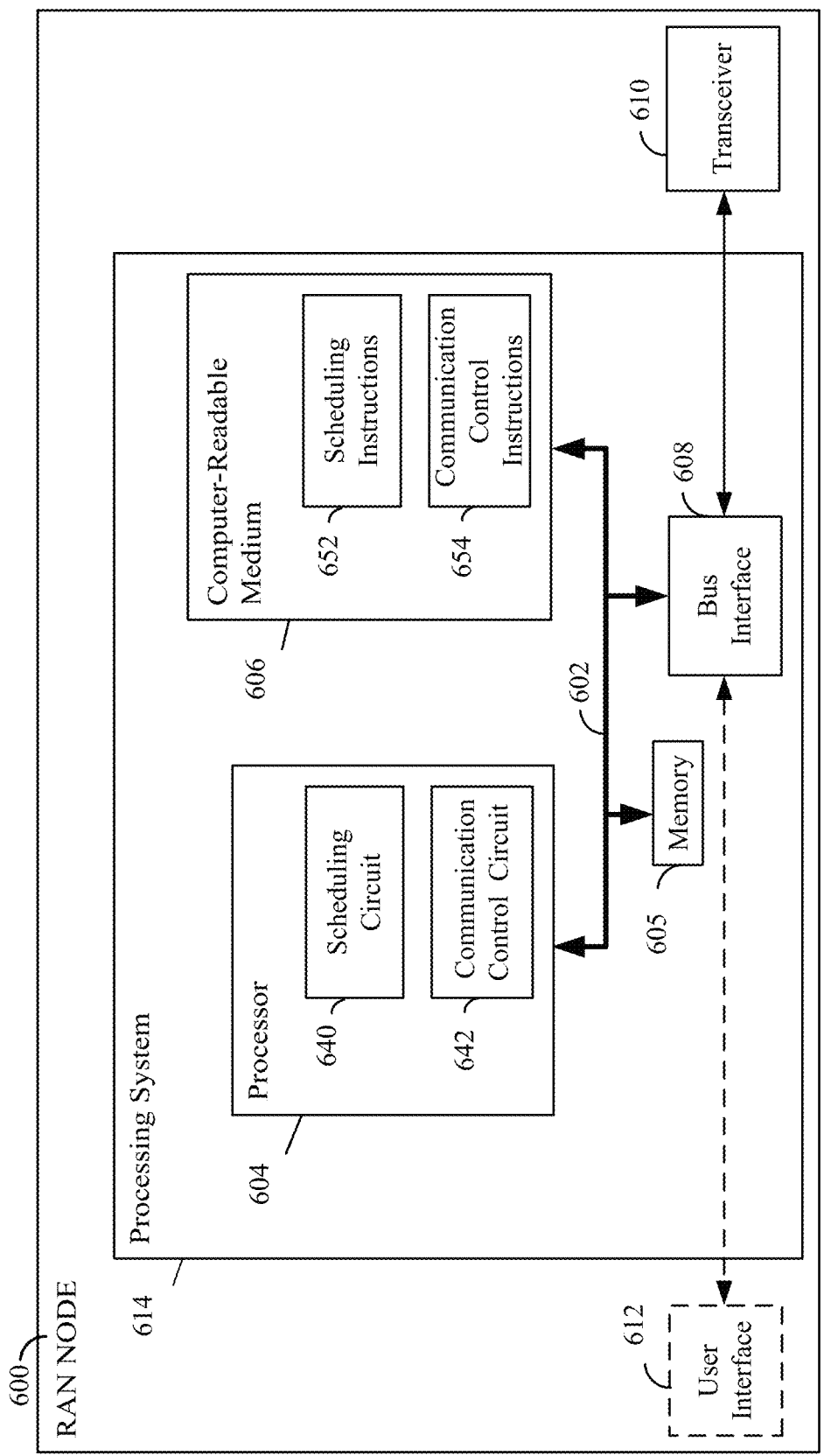
FIG. 6 is a block diagram conceptually illustrating an example of a hardware implementation for a radio access network node according to some aspects of this disclosure.

FIG. 6 is a block diagram illustrating an example of a hardware implementation for a RAN node 600 employing a processing system 614. For example, the RAN node 600 may be a user equipment (UE) as illustrated in any one or more of FIGS. 1, 2, and/or 3. In another example, the RAN node 600 may be a base station as illustrated in one or both of FIGS. 1 and 2. In still another example, the RAN node 600 may be a component of a disaggregated RAN such as a CU, a DU, and/or an RU as illustrated in FIG. 3.

The RAN node 600 may include a processing system 614 having one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN node 600 may be configured to perform any one or more of the functions described herein. For example, the processor 604, as utilized in a RAN node 600, may be configured (e.g., in coordination with the memory 605) to implement any one or more of the processes and procedures described below and illustrated in FIG. 17.

The processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or means for communicating with various other apparatus over a transmission medium. Depending upon the nature of the apparatus, a user interface 612 (e.g., keypad, display, speaker, microphone, joystick) may also be provided. Of course, such a user interface 612 is optional, and some examples, such as a base station, may omit it.

In some aspects of the disclosure, the processor 604 may include scheduling circuitry 640 configured (e.g., in coordination with the memory 605) for various functions, including, e.g., generating and transmitting scheduling information such as scheduling grants, DCIs, etc. for transmission via transceiver 610. The processor 604 may further include communication control circuitry 642 configured (e.g., in coordination with the memory 605) for various functions, including, e.g., receiving and processing UL transmissions including but not limited to PUSCH and PUCCH transmissions.

The processor 604 is responsible for managing the bus 602 and general processing, including the execution of software stored on the computer-readable medium 606. The software, when executed by the processor 604, causes the processing system 614 to perform the various functions described below for any particular apparatus. The processor 604 may also use the computer-readable medium 606 and the memory 605 for storing data that the processor 604 manipulates when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may store computer-executable code that includes scheduling instructions 652 that configure a RAN node 600 for various functions, including, e.g., generating and transmitting scheduling information such as scheduling grants, DCIs, etc. for transmission via transceiver 610. The computer-readable storage medium 606 may further store computer-executable code that includes communication control instructions 654 that configure a RAN node 600 for various functions, including, e.g., receiving and processing UL transmissions including but not limited to PUSCH and PUCCH transmissions.

In one configuration, a RAN node 600 includes means for transmitting a UL grant and means for receiving a PUSCH transmission. In one aspect, the aforementioned means may be the processor(s) 604 shown in FIG. 6 configured to perform the functions recited by the aforementioned means. In another aspect, the aforementioned means may be a circuit or any apparatus configured to perform the functions recited by the aforementioned means.

Figure 17:
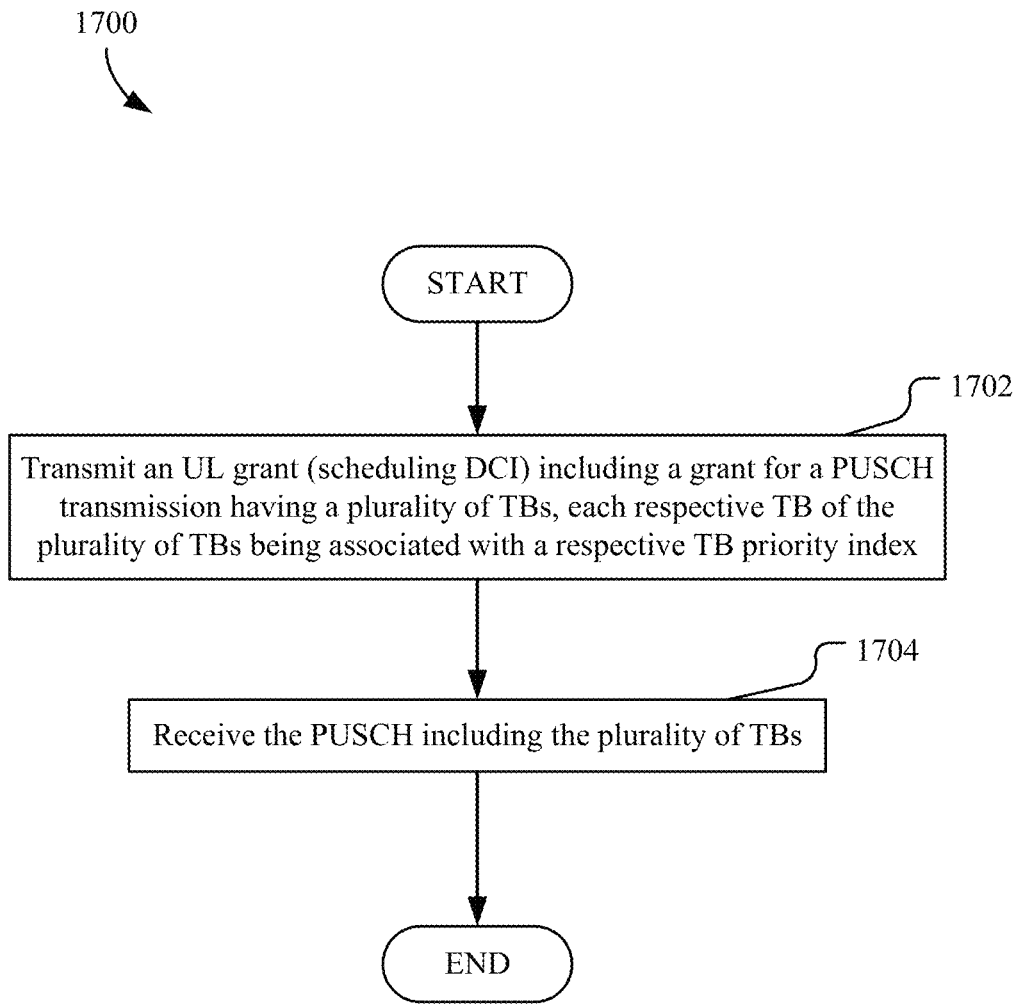
FIG. 17 is a flow chart illustrating an example of a process for a physical uplink shared channel (PUSCH) reception with multiple transport blocks (TBs) according to some aspects of this disclosure.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1, 2, 3, and/or 6 and utilizing, for example, the processes and/or algorithms described herein in relation to FIG. 17.

Figure 7:
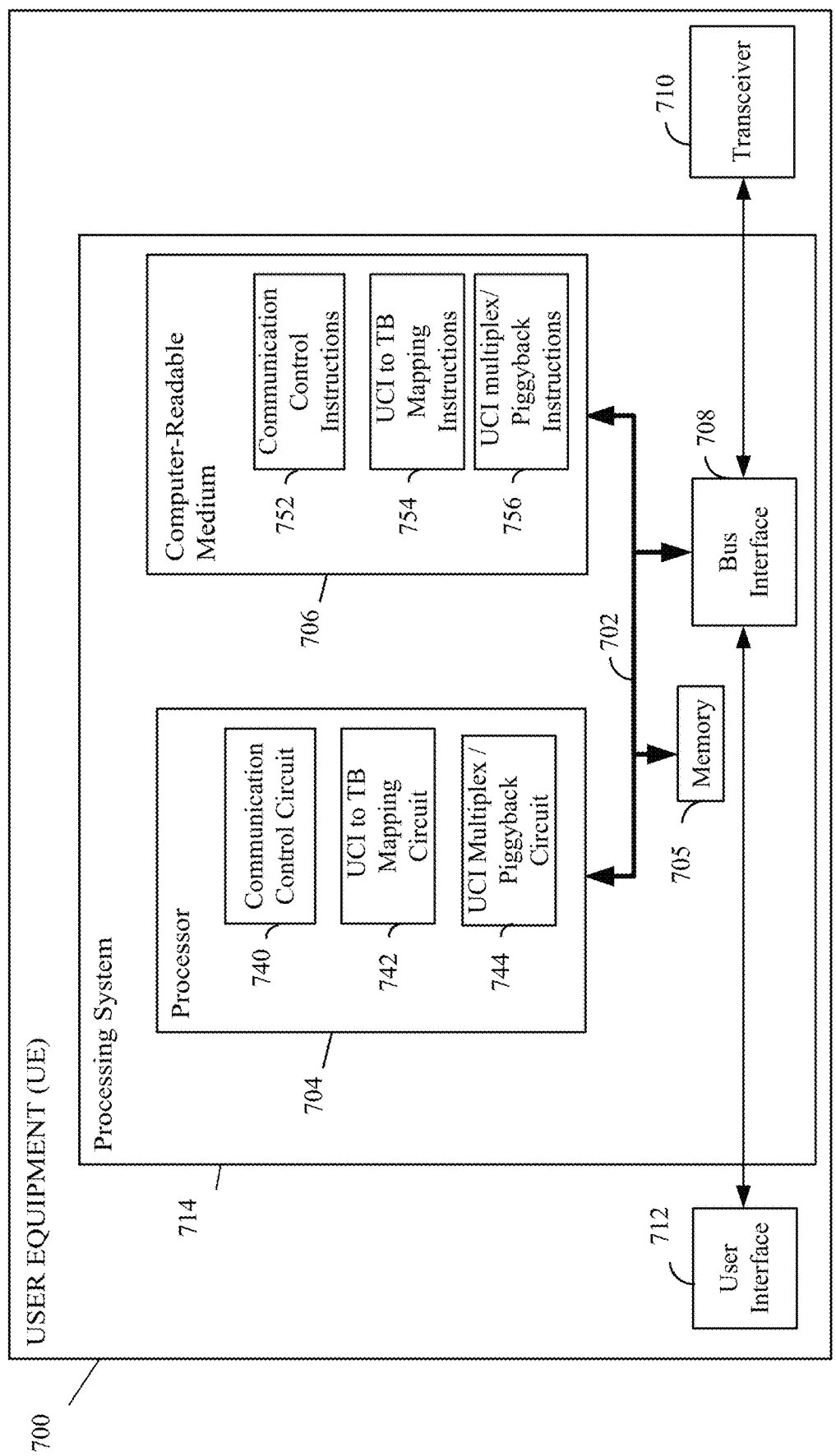
FIG. 7 is a block diagram conceptually illustrating an example of a hardware implementation for a user equipment (UE) according to some aspects of this disclosure.

FIG. 7 is a conceptual diagram illustrating an example of a hardware implementation for an exemplary scheduled entity or UE 700 employing a processing system 714. In accordance with various aspects of the disclosure, a processing system 714 may include an element, or any portion of an element, or any combination of elements having one or more processors 704. For example, the UE 700 may be a user equipment (UE) or scheduled entity as illustrated in any one or more of FIGS. 1, 2, and/or 3.

The processing system 714 may be substantially the same as the processing system 614 illustrated in FIG. 6, including a bus interface 708, a bus 702, memory 705, a processor 704, and a computer-readable medium 706. Furthermore, the UE 700 may include a user interface 712 and a transceiver 710 substantially similar to those described above in FIG. 6. That is, the processor 704, as utilized in a UE 700, may be configured (e.g., in coordination with the memory 705) to implement any one or more of the processes described below and illustrated in FIGS. 9, 10, 11, 12, 13, 14, and/or 16.

In some aspects of the disclosure, the processor 704 may include communication control circuitry 740 configured (e.g., in coordination with the memory 705) for various functions, including, for example, receiving and processing scheduling information (e.g., a scheduling DCI, an UL grant, etc.) from a scheduling entity, generating and transmitting a PUSCH transmission, channel coding (e.g., encoding) data packets for transmission, etc. The processor 704 may further include UCI to TB mapping circuitry 742 configured (e.g., in coordination with the memory 705) for various functions, including, for example, mapping a set of UCIs to a TB based on, e.g., a UCI priority index, a TB priority index, a TB index, an MCS of the TB, an amount of UCI resources available on the TB, a number of layers for the TB, etc. The processor 704 may further include UCI multiplexing/piggybacking circuitry 744 configured (e.g., in coordination with the memory 705) for various functions, including, for example, transmitting (e.g., in coordination with the transceiver 710) UCIs multiplexed with a PUSCH transmission, rate matching a TB around a UCI, puncturing a TB, etc.

And further, the computer-readable storage medium 706 may store computer-executable code that includes communication control instructions 752 that configure a UE 700 for various functions, including, e.g., receiving and processing scheduling information (e.g., a scheduling DCI, an UL grant, etc.) from a scheduling entity, generating and transmitting a PUSCH transmission, channel coding (e.g., encoding) data packets for transmission, etc. The computer-readable storage medium 706 may further store computer-executable code that includes UCI to TB mapping instructions 754 that configure a UE 700 for various functions, including, e.g., mapping a set of UCIs to a TB based on, e.g., a UCI priority index, a TB priority index, a TB index, an MCS of the TB, an amount of UCI resources available on the TB, a number of layers for the TB, etc. The computer-readable storage medium 706 may further store computer-executable code that includes UCI multiplexing/piggybacking instructions 756 that configure a UE 700 for various functions, including, e.g., transmitting (e.g., in coordination with the transceiver 710) UCIs multiplexed with a PUSCH transmission, rate matching a TB around a UCI, puncturing a TB, etc.

In one configuration, a UE 700 includes means for receiving information, means for transmitting information, means for multiplexing UCIs onto TBs, means for encoding, means for decoding, means for determining an amount of resources for carrying control information on a TB, means for mapping a UCI to a TB, and means for forgoing to transmit information. In one aspect, the aforementioned means may be the processor(s) 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 2, and/or 3, and utilizing, for example, the processes and/or algorithms described herein in relation to FIGS. 9, 10, 11, 12, 13, 14, and/or 16.

Figure 8:
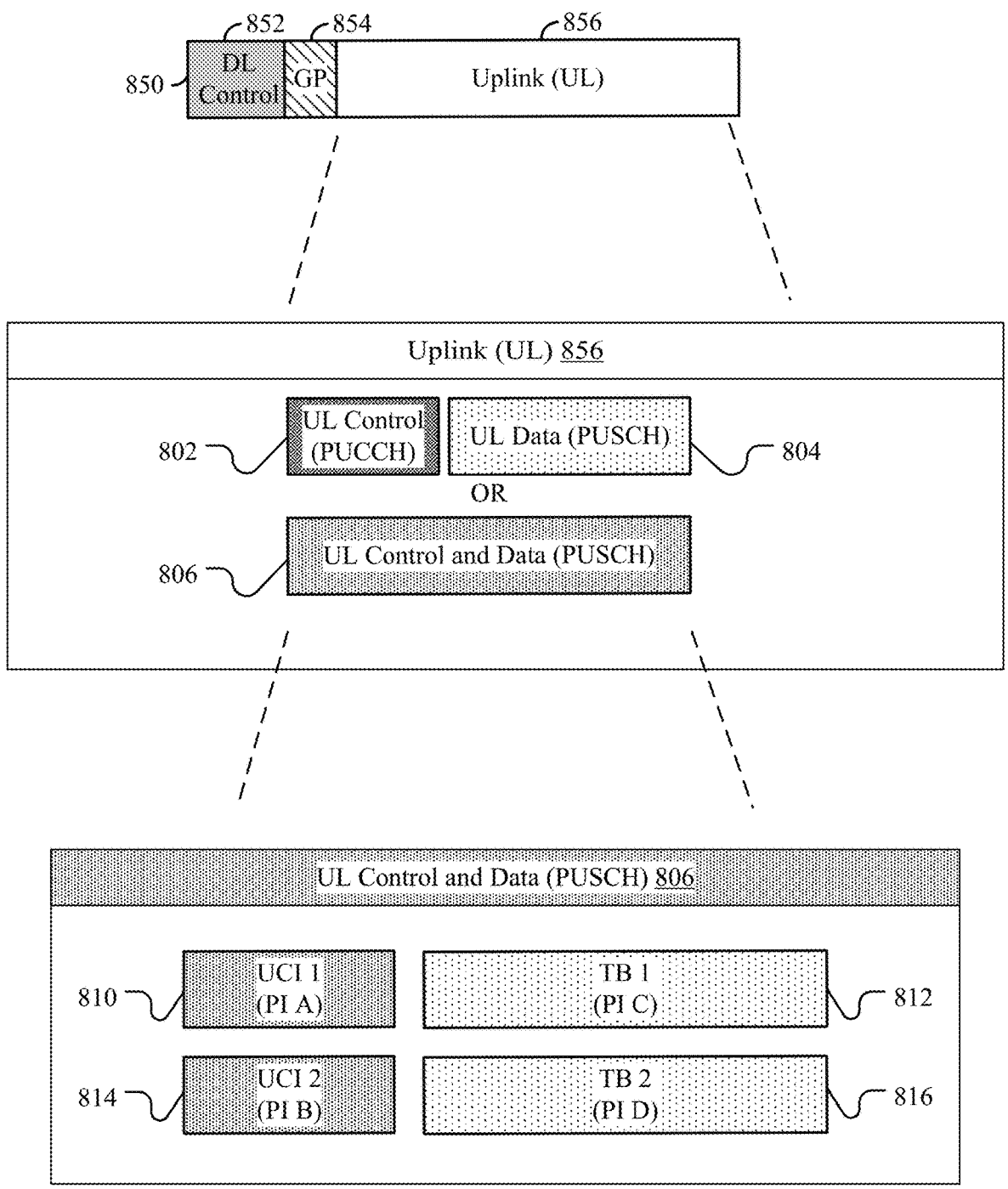
FIG. 8 is a schematic illustration of an uplink slot according to some aspects of this disclosure.

FIG. 8 illustrates a further example of a slot 850 according to some aspects of this disclosure. This slot may correspond to the slot 514 described above and illustrated in FIG. 5. As illustrated, the slot 850 includes a DL control region 852, a guard period (GP) 854, and a UL region 856. That is, the example illustrated shows a slot having a portion of resources designated for UL transmission by a UE. The illustrated slot format is merely one example, however, and any suitable slot structure or format that includes one or more UL regions may be employed within the scope of this disclosure.

The central portion of FIG. 8 shows an expanded view of the UL region 856, illustrating two different examples according to various aspects. In a first example, the UL region 856 may include an UL control portion 802 and an UL data portion 804. In this example, the UL region 856 may carry a PUCCH in an UL control portion 802 and a PUSCH in a UL data portion 804. Here, the PUCCH may carry one or more UCIs, and the PUSCH may carry one or more TBs. However, in certain examples one or more UCIs may be piggybacked, or multiplexed onto the PUSCH. For example, UL control and data region 806 may include a PUSCH that carries one or more TBs multiplexed with one or more UCIs, without a separate PUCCH. Piggybacking, or multiplexing, a UCI onto a PUSCH may be performed, for example, when a scheduled UE transmission of a UCI overlaps in the time domain with a scheduled transmission of a PUSCH. In this case, the UE may drop the PUCCH transmission 802 and multiplex the UCI onto the PUSCH 806. That is, the UCI may be transmitted together with the user data or traffic on the PUSCH 806. In some cases, a UCI may be piggybacked or multiplexed on the PUSCH by puncturing the PUSCH. In other cases, the UCI may be piggybacked on the PUSCH by rate matching the PUSCH around the UCI.

In the context of the present disclosure, multiplexing (or equivalently, piggybacking) a UCI on a PUSCH refers to carrying the UCI on the PUSCH, without a corresponding same-slot PUCCH. That is, rather than transmitting a slot having a UCI on a PUCCH together with a TB on a PUSCH, when a UCI is multiplexed with a PUSCH in this disclosure, the UCI may be multiplexed by, for example, puncturing the TB(s) on the PUSCH or rate matching the TB(s) on the PUSCH, such that the UCI and TB are both carried on the PUSCH.

When multiplexing a UCI onto a PUSCH, a UE may have limited space in the PUSCH available for the UCI. Thus, a UE may determine the amount of resources on the PUSCH that are available for the UCI. That is, while a PUSCH may contain a given set of resources, some of these resources may be allocated for data transmission and unavailable for carrying the UCI. To determine PUSCH resources for the UCI, a UE may employ parameters alpha and beta. As discussed below, the UE may determine that the amount of resources available for the UCI is the minimum between an upper bound (based on the alpha factor) and an encoded UCI size (based on the beta offset).

For example, to determine the encoded UCI size, a UE may determine the code rate to be used for channel coding or encoding the UCI. According to some examples, when multiplexing a UCI onto a TB, a parameter that may be referred to as a "beta offset" or beta factor may be used to scale the spectral efficiency (i.e., the code rate) of the UCI relative to the known spectral efficiency (i.e., code rate) of user data on the TB. That is, when a UCI is multiplexed with data on a TB, the beta offset scales the code rate of the UCI with respect to the known code rate of the user data on the TB. For example, scaling down to a lower code rate can provide higher reliability for the UCI relative to that of the data on the PUSCH. In another example, scaling up to a higher code rate can reduce UCI overhead when a PUSCH has higher priority than the UCI. The larger the beta offset, the lower the UCI code rate. I.e., a larger beta offset means that a UCI occupies more resources in the PUSCH.

Further, a parameter that may be referred to as an "alpha factor" may define an upper bound on the amount of PUSCH resources that are available for the UCI. For example, if the total amount of resources on a TB is equal to N, then the maximum amount of resources available on that TB for a UCI may be equal to alpha times N.

A UE may determine the actual resources for a UCI on a given TB based on both the beta factor and the alpha factor. For example, the UCI resources may be determined as the minimum resources between that based on the beta offset and the upper bound based on the alpha factor.

In some aspects of this disclosure, a PUSCH may carry a plurality of TBs. For example, 3GPP specifications for 5G NR may support multiple TBs in a PUSCH transmission when the PUSCH contains greater than 4 layers. In a multi-TB PUSCH transmission, different TBs may have a different modulation and coding scheme (MCS), a different redundancy version (RV), different numbers of layers, and/or other different characteristics from one another. In some instances, a UE may, as a rule, assign all TBs in a given PUSCH with the same priority index. In these instances, a network may employ conventional signaling to indicate the priority of the PUSCH to the UE, as discussed above. In other cases, a UE may assign different TBs on a given PUSCH with different priority indices. For example, a multiplexed UCI and PUSCH 806 may carry two TBs, where one TB is a high priority and another TB is a low priority TB. In these cases, a RAN node may provide a UE with an UL scheduling DCI (e.g., scheduling grant) that provides a plurality of priority index fields corresponding to the plurality of TBs. For example, an UL scheduling DCI may include a set of two priority index indicator fields for indicating the priority indices for a UE to assign to a set of two TBs in a given multi-TB PUSCH transmission.

In further aspects of this disclosure, a PUSCH may carry a plurality of UCIs. That is, a plurality of UCIs may be multiplexed or piggybacked on a PUSCH 806, along with a set of one or more TBs as described above. Referring again to FIG. 8, as an illustrative example, UL control and data 806 is shown in an expanded view including two UCIs 810 and 814 and two TBs 812 and 816. The respective UCIs and TBs are labeled UCH 810 having priority index (PI) A, UCI2 814 having PI B, TB1 having PI C, and TB2 having PI D. Any of the PIs A, B, C, and D may have any suitable value, for example, a PI 1 indicating a high-priority and a PI 0 indicating a low-priority.

Figure 9:
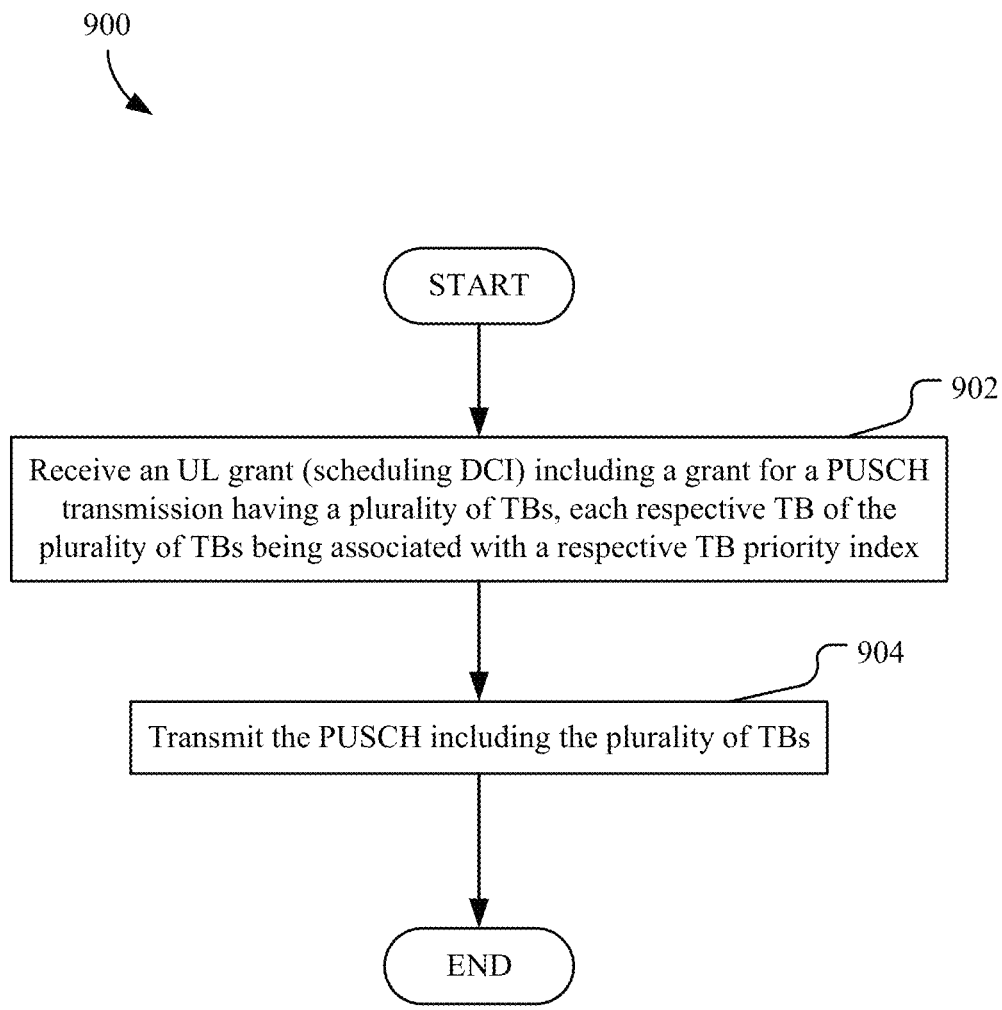
FIG. 9 is a flow chart illustrating an example of a process for a physical uplink shared channel (PUSCH) transmission with multiple transport blocks (TBs) according to some aspects of this disclosure.

FIG. 9 is a flow chart illustrating an exemplary process 900 for a PUSCH transmission with multiple TBs in accordance with some aspects of the present disclosure. As described below, a particular implementation may omit some or all illustrated features and may not require some illustrated features to implement all embodiments. In some examples, the UE 700 illustrated in FIG. 7 may be configured to carry out the process 900. In some examples, any suitable apparatus or means for carrying out the functions or algorithm described below may carry out the process 900.

At block 902, a UE 700 receives (e.g., utilizing transceiver 710) an UL grant or UL scheduling DCI that includes a grant for a PUSCH transmission having a plurality of TBs. Here, each respective TB of the plurality of TBs is associated with a respective TB priority index. For example, communication control circuitry 740 may process scheduling information from a scheduling entity 600 including a scheduling DCI. When each respective TB is associated with a respective TB priority index, a single PUSCH transmission can carry multiple TBs having different priorities.

At block 904, the UE 700 transmits the scheduled PUSCH including the plurality of TBs. For example, transceiver 710 may be used to transmit the scheduled transmission including TBs having a configured MCS, number of layers, etc.

In a case where a PUSCH transmission includes multiple TBs, and where multiple UCIs are to be multiplexed onto the same PUSCH transmission, it raises the question which UCI is mapped to which TB. That is, in some examples, all UCIs may be mapped to a first TB. However, the amount of resources available for UCIs on a given TB may be limited, as described above in relation to the parameters alpha and beta. Thus, the set of control information may be segmented into a plurality of UCIs to be multiplexed on a plurality of TBs.

In particular, when UCIs having different priority indices are mapped to TBs that have the same priority index as one another, it may be unclear how to map the UCIs to the TBs. Various aspects of the present disclosure address these and other related questions and issues.

Figure 10:
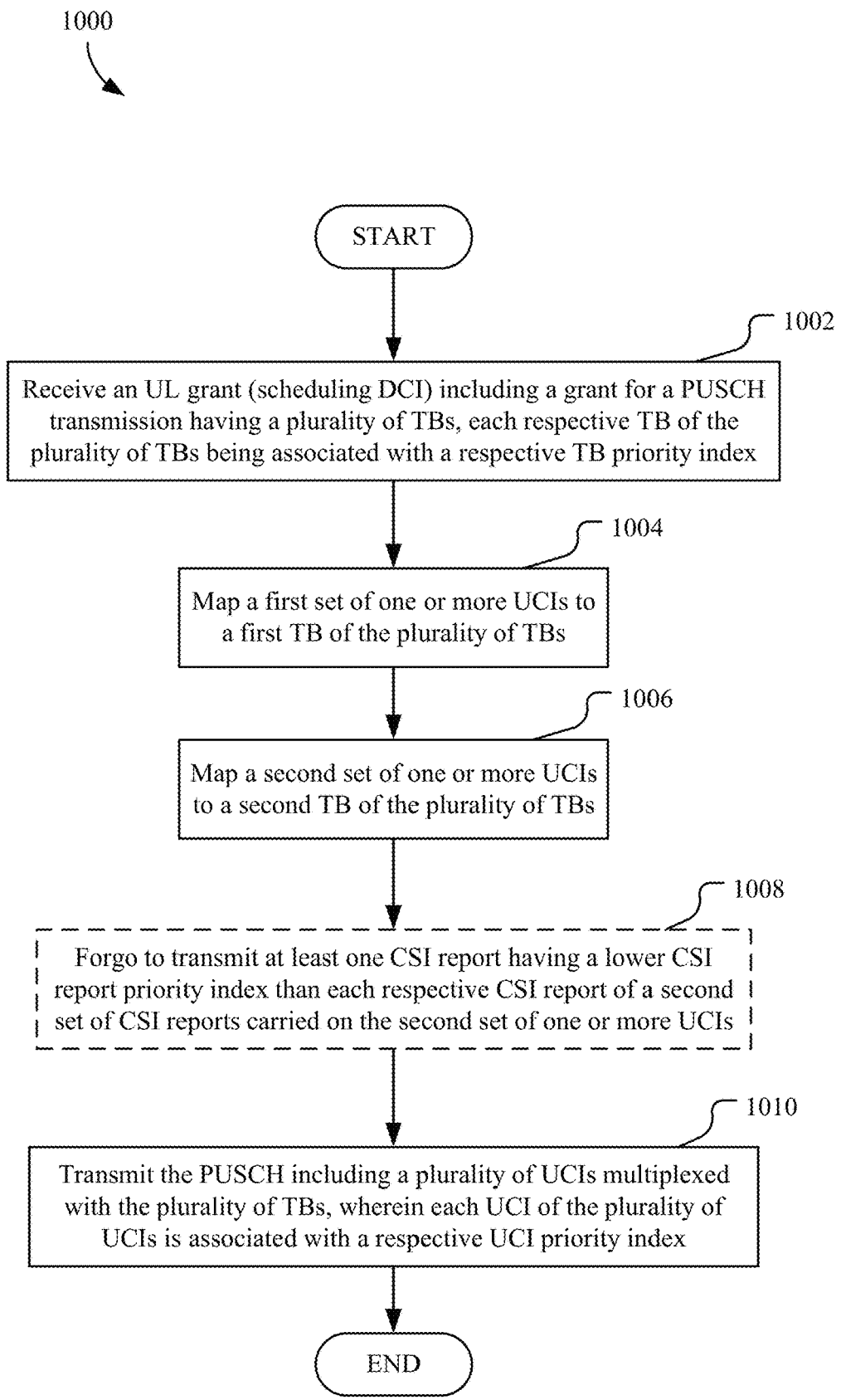
FIG. 10 is a flow chart illustrating an example of a process for a PUSCH transmission with multiple uplink control information (UCIs) multiplexed with multiple TBs according to some aspects of this disclosure.

FIG. 10 is a flow chart illustrating an exemplary process 1000 for a PUSCH transmission with multiple UCIs multiplexed with multiple TBs in accordance with some aspects of the present disclosure. As described below, a particular implementation may omit some or all illustrated features and may not require some illustrated features to implement all embodiments. In some examples, the UE 700 illustrated in FIG. 7 may be configured to carry out the process 1000. In some examples, any suitable apparatus or means for carrying out the functions or algorithm described below may carry out the process 1000.

At block 1002, a UE 700 receives (e.g., utilizing transceiver 710) an UL grant or UL scheduling DCI that includes a grant for a PUSCH transmission having a plurality of TBs. Here, each respective TB of the plurality of TBs is associated with a respective TB priority index. For example, communication control circuitry 740 may process scheduling information from a scheduling entity 600 including a scheduling DCI. When each respective TB is associated with a respective TB priority index, a single PUSCH transmission can carry multiple TBs having the same or different priorities.

At block 1004, the UE 700 may map a first set of one or more UCIs to a first TB of the plurality of TBs; and at block 1006, the UE 700 may map a second set of one or more UCIs to a second TB of the plurality of TBs. For example, UE 700 may employ UCI-to-TB mapping circuitry 742 to determine which UCI(s) to map to which TB based on one or more factors such as UCI priority indices, TB priority indices, TB indices, TB MCS, number of layers, etc. as described further below.

In some examples, the RAN may provide a control message (e.g., an RRC message, a MAC-CE, a DCI, etc.) indicating to the UE 700 which TB to multiplex which UCI to. For example, the RAN may indicate that UCIs may only be multiplexed to a particular TB of a plurality of TBs. In this case, the UCI-to-TB mapping circuitry 742 would simply follow this instruction and map any UCI to the indicated TB. In another example, the RAN may indicate that the UCIs may be multiplexed on two (or more) TBs. In this case, the UCI-to-TB mapping circuitry 742 may determine which TB to map a UCI to based on the one or more factors as described below.

At optional block 1008, the UE 700 may forgo to transmit at least one CSI report. For example, the UE 700 may forgo to transmit a CSI report having a lower CSI report priority index than those associated with the first TB1 and the second TB2. This block is described further below in connection with FIG. 16 and its associated description of CSI report omissions.

At block 1010 the UE 700 may transmit (e.g., utilizing transceiver 710) the PUSCH transmission including a plurality of UCIs multiplexed with the plurality of TBs. Here, each UCI of the plurality of UCIs is associated with a respective UCI priority index. That is, each TB is associated with a respective TB priority index, while each multiplexed UCI is associated with a respective UCI priority index.

When a UE is to multiplex a plurality of UCIs onto a PUSCH having a plurality of TBs, the UE may apply the same beta offset for each UCI, or different beta offsets for different UCIs mapped to different TBs. For example, if different TBs are transmitted over different layers or otherwise over channels having different channel characteristics, the channel quality may differ for different TBs. Thus, the coding rate for those respective TBs may differ. As for the UCIs mapped to those TBs, there may be different reliability requirements based, e.g., on UCI priorities. Therefore, to improve or optimize the probability that each UCI is correctly decoded by the receiver, a UE may apply different beta offsets for different UCIs mapped to different TBs.

In some examples, a RAN node may provide a UE with an UL grant or scheduling DCI that includes a plurality of beta offset fields. For example, for a PUSCH scheduled for two TBs, the UL grant may provide two separate beta offset fields, one corresponding to each TB. In this manner, when UCIs are mapped to the respective TBs, the UE may apply the corresponding beta offsets to scale the code rate for the respective UCIs.

In further examples, a UL grant or scheduling DCI may provide a single beta offset field, although the UL grant schedules a plurality of TBs. In these examples, a UE may apply the same beta offset value to each TB or may apply different beta offset values to different TBs. For example, a RAN node may provide a UE with RRC signaling configuring the UE with multiple (e.g., 2) beta offset tables or values for corresponding TBs. Here, the UE may apply different beta offsets to the different TBs based on their respective beta offset tables or values. In further examples, the UE may select a beta offset to utilize for each TB based on some suitable factor, such as the maximum beta offset value based on the received beta offset parameter and a plurality of configured beta offset tables or values. By selecting the maximum beta offset a UE can improve the likelihood that both UCIs will be decoded correctly by the receiver.

Figure 11:
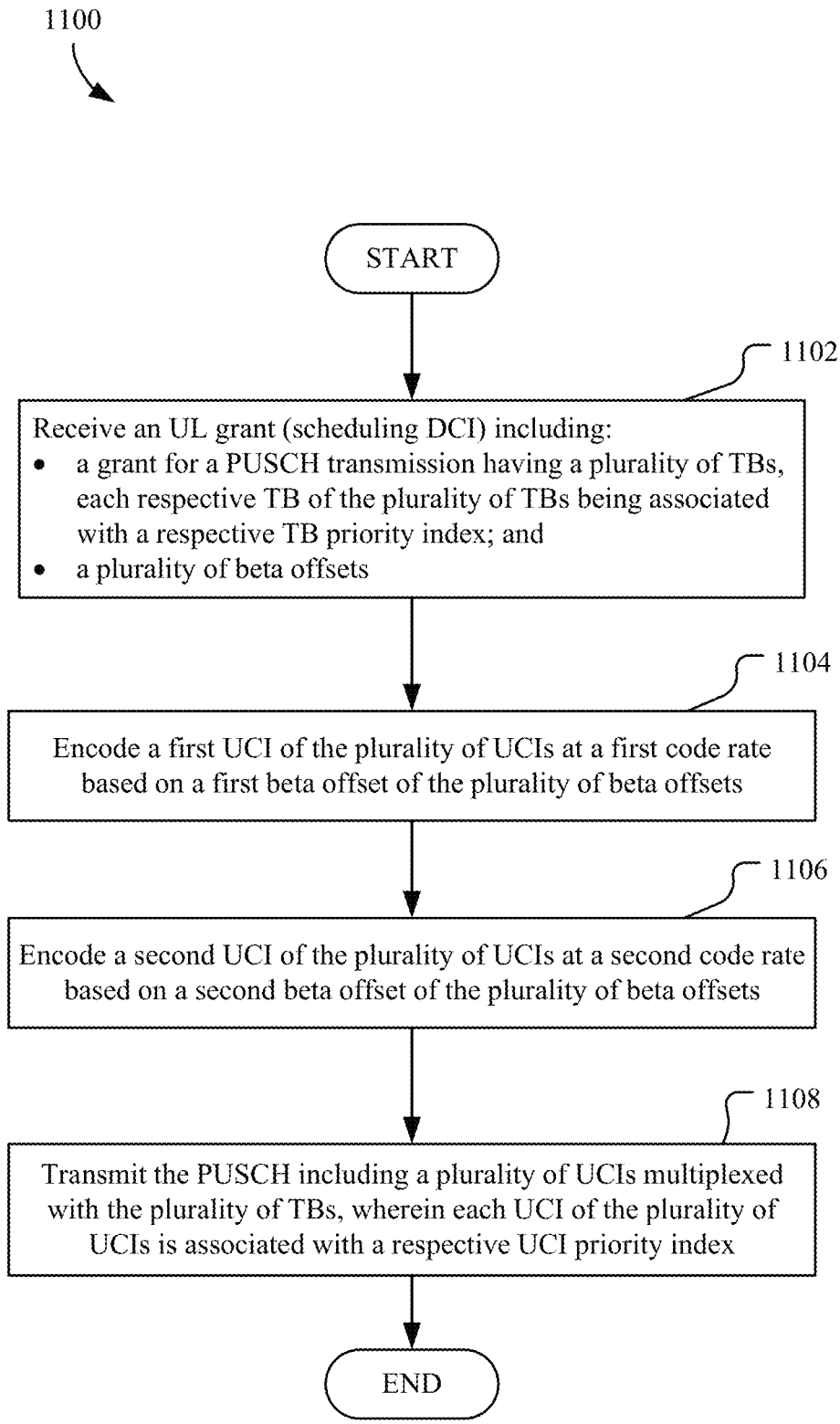
FIG. 11 is a flow chart illustrating an example of a process for determining a code rate for each of a plurality of UCIs transmitted with multiple TBs according to some aspects of this disclosure.

FIG. 11 is a flow chart illustrating an exemplary process 1100 for determining a code rate for each of a plurality of UCIs transmitted with multiple TBs in accordance with some aspects of the present disclosure. As described below, a particular implementation may omit some or all illustrated features and may not require some illustrated features to implement all embodiments. In some examples, the UE 700 illustrated in FIG. 7 may be configured to carry out the process 1100. In some examples, any suitable apparatus or means for carrying out the functions or algorithm described below may carry out the process 1100.

At block 1102, a UE 700 receives (e.g., utilizing a transceiver 710) an UL grant or UL scheduling DCI that includes a grant for a PUSCH transmission having a plurality of TBs. Here, each respective TB of the plurality of TBs is associated with a respective TB priority index. Further, the UL grant includes a plurality of beta offsets. For example, communication control circuitry 740 may process scheduling information from a scheduling entity 600 including a scheduling DCI.

At block 1104, the UE 700 may encode a first UCI of the plurality of UCIs at a first code rate based on a first beta offset; and at block 1106, the UE 700 may encode a second UCI of the plurality of UCIs at a second code rate based on a second beta offset. That is, the UE may map the respective UCIs to respective TBs, where the code rate for the respective TBs is known. The UE 700 may utilize the beta offsets received at block 1102 to determine code rates of the respective UCIs, based on their corresponding TBs.

At block 1108, the UE 700 may transmit (e.g., utilizing transceiver 710) the PUSCH transmission including a plurality of UCIs multiplexed with a plurality of TBs. Here, each UCI of the plurality of UCIs is associated with a respective UCI priority index and is encoded at a suitable code rate as described above.

Figure 12:
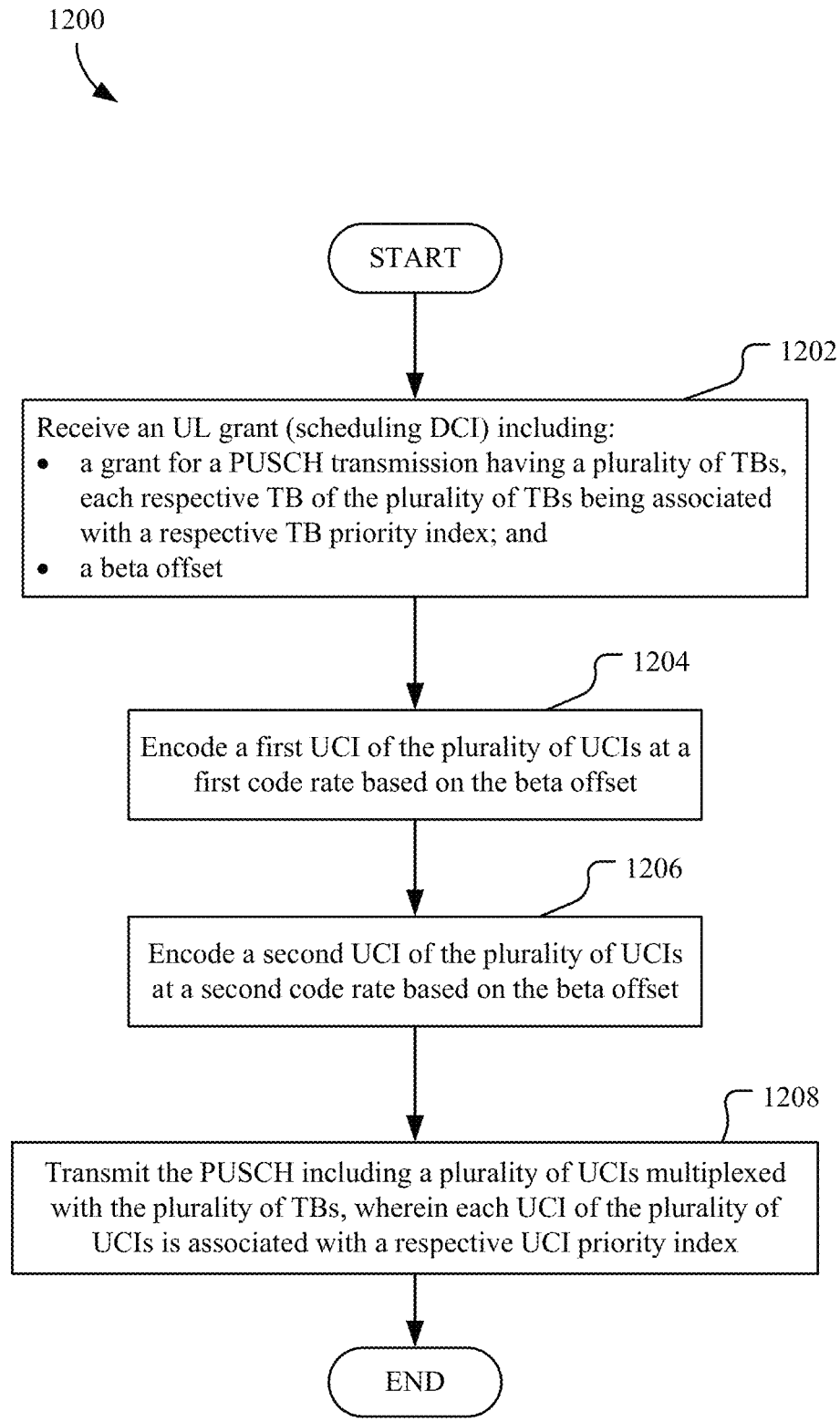
FIG. 12 is a flow chart illustrating another example of a process for determining a code rate for each of a plurality of UCIs transmitted with multiple TBs according to some aspects of this disclosure.

FIG. 12 is a flow chart illustrating an exemplary process 1200 for determining a code rate for each of a plurality of UCIs transmitted with multiple TBs in accordance with further aspects of the present disclosure. As described below, a particular implementation may omit some or all illustrated features and may not require some illustrated features to implement all embodiments. In some examples, the UE 700 illustrated in FIG. 7 may be configured to carry out the process 1200. In some examples, any suitable apparatus or means for carrying out the functions or algorithm described below may carry out the process 1200.

At block 1202, a UE 700 receives (e.g., utilizing a transceiver 710) an UL grant or UL scheduling DCI that includes a grant for a PUSCH transmission having a plurality of TBs. Here, each respective TB of the plurality of TBs is associated with a respective TB priority index. Further, the UL grant includes a beta offset parameter. For example, communication control circuitry 740 may process scheduling information from a scheduling entity 600 including a scheduling DCI.

At block 1204, the UE 700 may encode a first UCI of the plurality of UCIs at a first code rate based on the beta offset; and at block 1106, the UE 700 may encode a second UCI of the plurality of UCIs at a second code rate based on the beta offset. That is, the UE may map the respective UCIs to respective TBs, where the code rate for the respective TBs is known. The UE 700 may utilize the beta offset received at block 1202 to determine code rates of the respective UCIs, based on their corresponding TBs. As described above, the first and second code rates may be the same or may differ. For example, the UE 700 may be RRC configured with two beta offset tables or values such that the UE can determine a beta offset to apply based on the beta offset parameter received at block 1202 and a corresponding stored beta offset table or value. And in other examples, the UE may select a beta offset to utilize for each TB based on some suitable factor, such as the maximum beta offset value based on the received beta offset parameter and the corresponding beta offset tables or values.

At block 1208, the UE 700 may transmit (e.g., utilizing transceiver 710) the PUSCH transmission including a plurality of UCIs multiplexed with a plurality of TBs. Here, each UCI of the plurality of UCIs is associated with a respective UCI priority index and is encoded at a suitable code rate as described above.

Furthermore, when a UE is to multiplex a plurality of UCIs onto a PUSCH having a plurality of TBs, the UE may apply the same alpha factor to each TB or may apply different alpha factors to different respective TBs. For example, a UE may be RRC configured with an alpha factor that applies to each TB of a plurality of TBs. In another example, a UE may be RRC configured with multiple (e.g., 2) alpha factors for application to multiple respective TBs. In an example where a UE is configured with multiple alpha factors, in some examples the UE may apply the first of these multiple alpha factors when an UL scheduling DCI only schedules one TB in a PUSCH.

Figure 13:
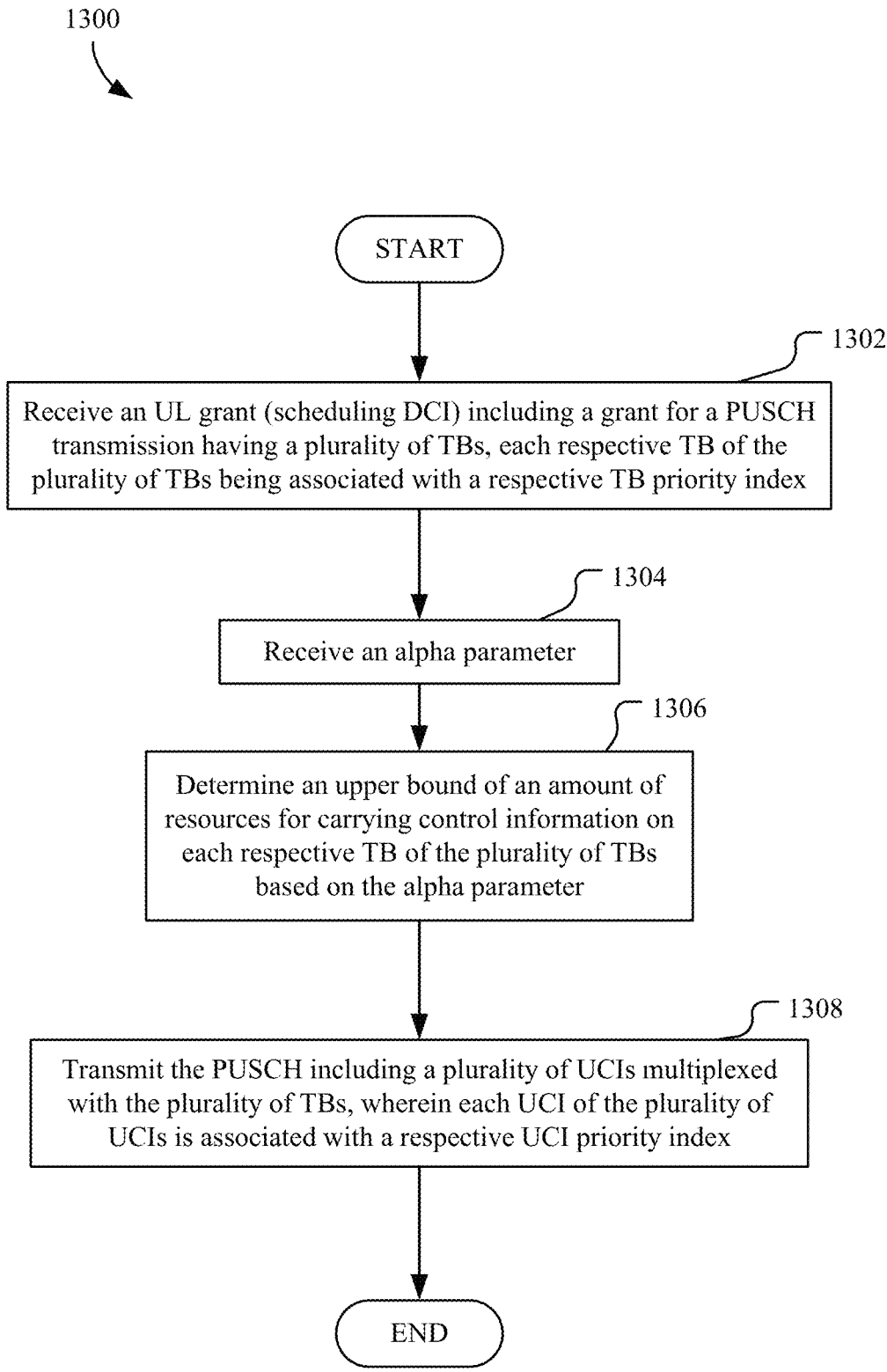
FIG. 13 is a flow chart illustrating an example of a process for determining an upper bound of an amount of resources for carrying control information on multiple TBs in a PUSCH transmission according to some aspects of this disclosure.

FIG. 13 is a flow chart illustrating an exemplary process 1300 for determining an upper bound of an amount of resources for carrying control information on multiple TBs in a PUSCH transmission in accordance with some aspects of the present disclosure. As described below, a particular implementation may omit some or all illustrated features and may not require some illustrated features to implement all embodiments. In some examples, the UE 700 illustrated in FIG. 7 may be configured to carry out the process 1300. In some examples, any suitable apparatus or means for carrying out the functions or algorithm described below may carry out the process 1300.

At block 1302, a UE 700 receives (e.g., utilizing a transceiver 710) an UL grant or UL scheduling DCI that includes a grant for a PUSCH transmission having a plurality of TBs. Here, each respective TB of the plurality of TBs is associated with a respective TB priority index. For example, communication control circuitry 740 may process scheduling information from a scheduling entity 600 including a scheduling DCI.

At block 1304, the UE 700 receives (e.g., utilizing the transceiver 710) an alpha parameter. As described above, the alpha parameter may be received utilizing any suitable control signaling, including but not limited to RRC signaling, via a MAC-CE, via DCI, etc.

At block 1306, the UE 700 may determine an upper bound of an amount of resources for carrying control information (e.g., UCI resources) on each respective TB of the plurality of TBs, based on the alpha parameter. For example, if the total amount of resources on a TB is equal to N, then the maximum amount of resources available for a UCI on that TB may be equal to alpha times N.

At block 1308, the UE 700 may transmit (e.g., utilizing transceiver 710) the PUSCH transmission including a plurality of UCIs multiplexed with the plurality of TBs. Here, each UCI of the plurality of UCIs is associated with a respective UCI priority index. That is, each TB is associated with a respective TB priority index, while each multiplexed UCI is associated with a respective UCI priority index.

Figure 14:
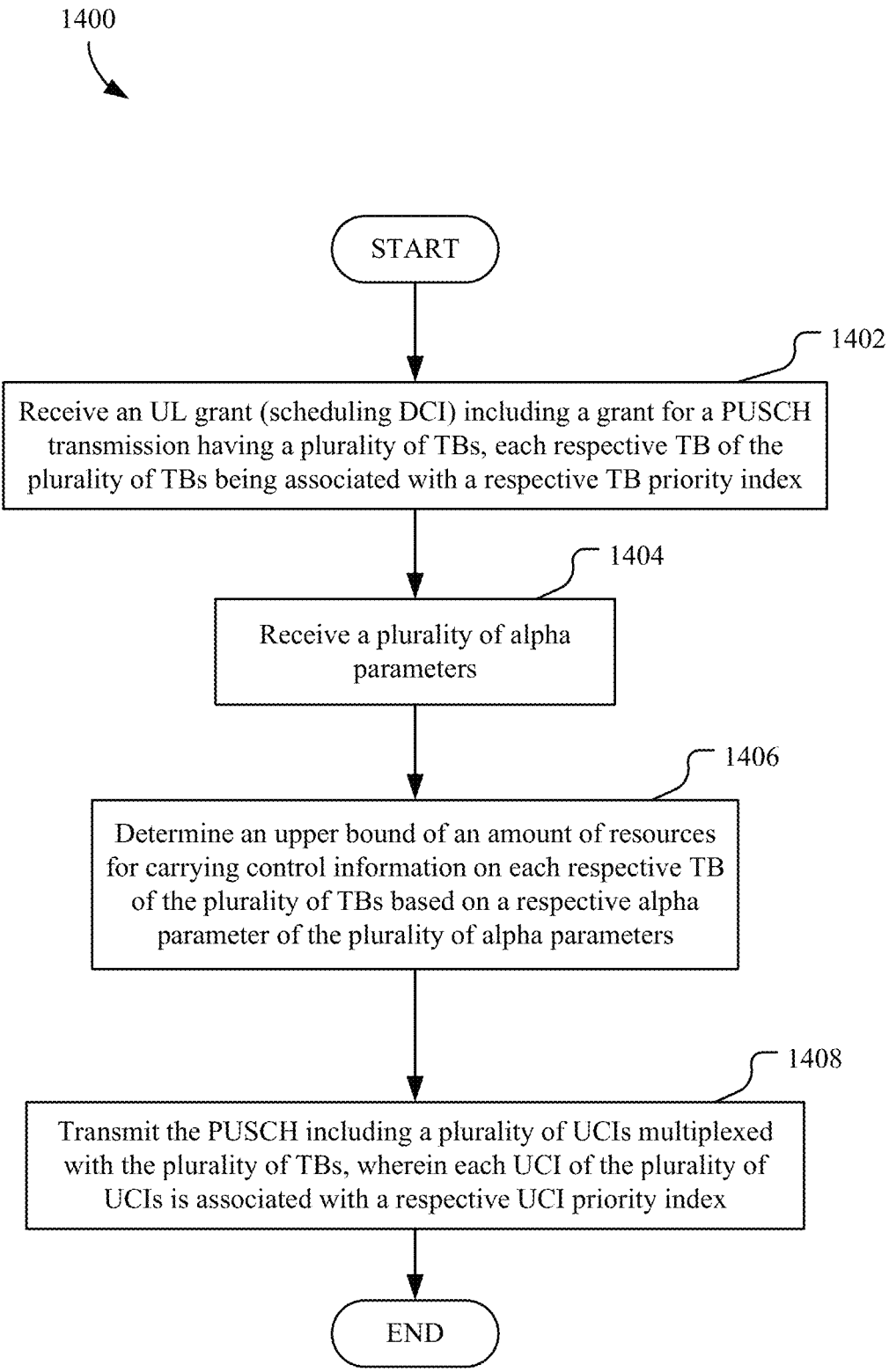
FIG. 14 is a flow chart illustrating another example of a process for determining an upper bound of an amount of resources for carrying control information on multiple TBs in a PUSCH transmission according to some aspects of this disclosure.

FIG. 14 is a flow chart illustrating another exemplary process 1300 for determining an upper bound of an amount of resources for carrying control information on multiple TBs in a PUSCH transmission in accordance with further aspects of the present disclosure. As described below, a particular implementation may omit some or all illustrated features and may not require some illustrated features to implement all embodiments. In some examples, the UE 700 illustrated in FIG. 7 may be configured to carry out the process 1300. In some examples, any suitable apparatus or means for carrying out the functions or algorithm described below may carry out the process 1300.

At block 1402, a UE 700 receives (e.g., utilizing a transceiver 710) an UL grant or UL scheduling DCI that includes a grant for a PUSCH transmission having a plurality of TBs. Here, each respective TB of the plurality of TBs is associated with a respective TB priority index. For example, communication control circuitry 740 may process scheduling information from a scheduling entity 600 including a scheduling DCI.

At block 1404, the UE 700 receives (e.g., utilizing the transceiver 710) a plurality of alpha parameters. As described above, the alpha parameters may be received utilizing any suitable control signaling, including but not limited to RRC signaling.

At block 1406, the UE 700 may determine an upper bound of an amount of resources for carrying control information (e.g., UCI resources) on each respective TB of the plurality of TBs, based on a respective alpha parameter of the plurality of alpha parameters. For example, if the total amount of resources on a given TB is equal to N, then the maximum amount of resources available for a UCI on that TB may be equal to the respective alpha parameter times N.

At block 1408 the UE 700 may transmit (e.g., utilizing transceiver 710) the PUSCH transmission including a plurality of UCIs multiplexed with the plurality of TBs. Here, each UCI of the plurality of UCIs is associated with a respective UCI priority index. That is, each TB is associated with a respective TB priority index, while each multiplexed UCI is associated with a respective UCI priority index.

Figure 15:
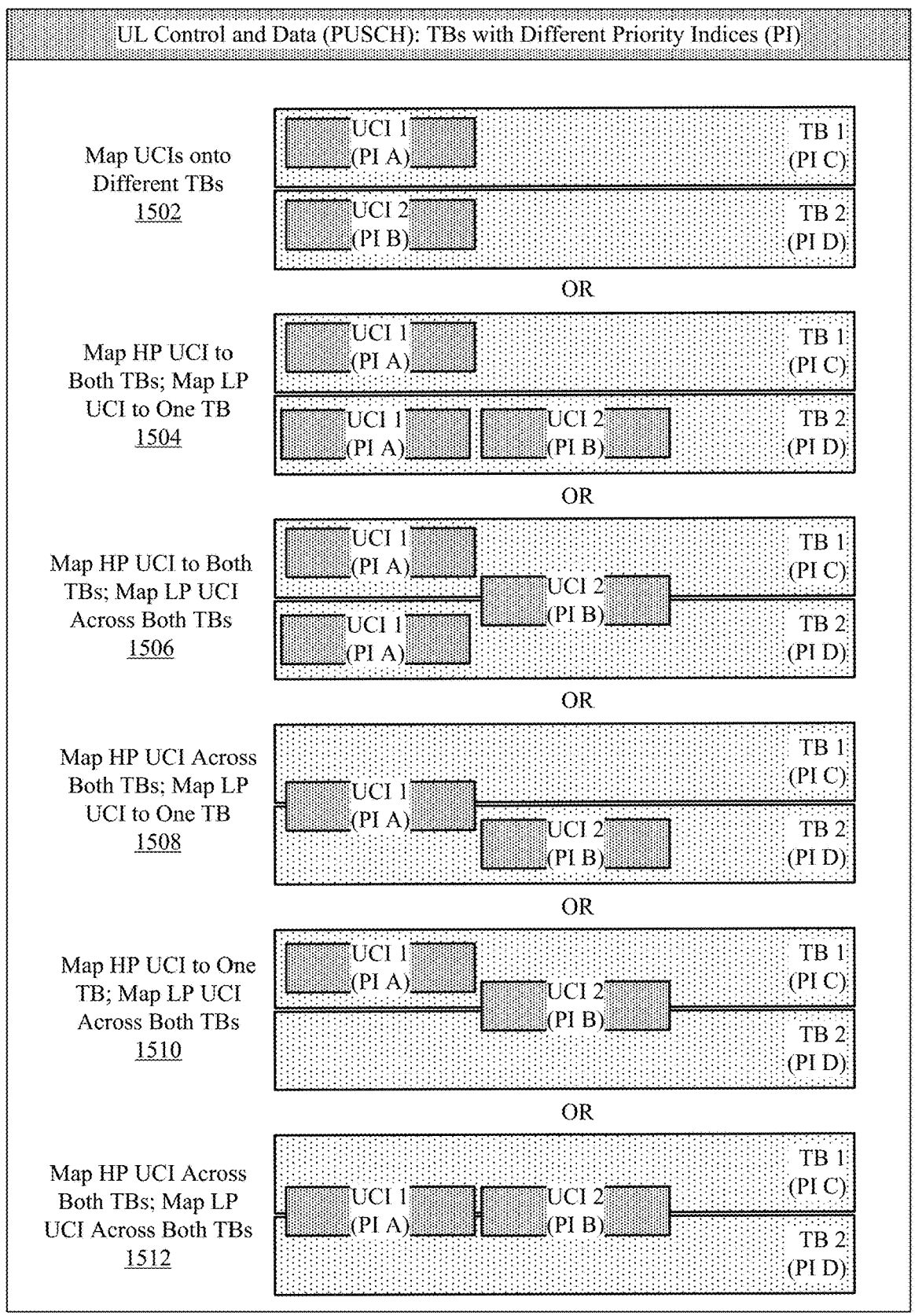
FIG. 15 is a schematic illustration of multiplexing plural UCIs with plural TBs according to some aspects of this disclosure.

According to further aspects of this disclosure, when multiplexing or piggybacking a plurality of UCIs onto a plurality of TBs for a PUSCH transmission, a UE may proceed to determine which UCI maps to which TB. For example, FIG. 15 illustrates several examples of UCI mapping to TBs according to a scenario where two UCIs are mapped onto two TBs. Those of ordinary skill in the art will recognize that the concepts illustrated in FIG. 15 and described herein below can be readily extended to any suitable number of UCIs and TBs in a PUSCH transmission. In the various illustrated examples, as in the PUSCH 806 described above and illustrated in FIG. 8, two UCIs are labeled UCI1 and UCI2, and two TBs are labeled TB1 and TB2. Each UCI can have its own UCI priority index (PIA or PIB), and each TB can have its own TB priority index (PIC or PID). The UCI priority indices may be the same or may differ; and the TB priority indices may be the same or may differ. Further, each TB may have a corresponding TB index, MCS, and number of layers.

In a first example, if UCI1 and UCI2 have the same priority index (i.e., PIA=PIB), the UE may treat both UCIs in the same manner as one another. For example, as shown in scenario 1502, if a first UCI1 is mapped to a first TB1, then a second UCI2 may be mapped to a second TB2. In a further example, if UCI1 and UCI2 have the same priority as one another, the UE may map the UCIs to the TB that has the same priority index as the UCIs (if there is one). For example, UCI1 and UCI2 may both be mapped to TB1 when PIA=PI B=PI C.

However, when the priority indices of the different UCIs being multiplexed into a given PUSCH differ from one another, it may be unclear which UCI maps to which TB. In some examples, a UE may apply scenario 1502 and may map the UCIs to different, respective TBs. For example, a first UCI1 may be mapped to a first TB1, while a second UCI2 may be mapped to a second TB2 (or vice-versa). In some other examples, a UE may apply one of scenarios 1504, 1506, or 1508 and may map a first UCI to both TB1 and TB2 and may map a second UCI to the second TB2. As one example, a UCI with a high priority (e.g., priority index 1) may be mapped to both TB1 and TB2, while a UCI with a low priority (e.g., priority index 0) may be mapped to the second TB2.

When a UE maps two UCIs to a given TB (as, for example, in scenarios 1504, 1506, 1508, 1510, or 1512, the respective UCIs may have the same priority as one another, or different priorities from one another. In some examples, a UE may avoid mapping UCIs of different priorities to the same TB. That is, when UCIs of different priorities are to be mapped to different TBs, the UE may map the respective UCIs to different TBs regardless of whether the two TBs are associated with the same priority or different priorities.

When a UE maps a UCI to multiple TBs, the UE can accomplish this mapping in various suitable manners. For example, as illustrated in scenarios 1504 and 1506, the first UCI1 may be repeated on both TB1 and TB2. In another example, as illustrated in scenario 1508, the first UCI1 (e.g., a high-priority, HP UCI) is mapped across both TB1 and TB2. For example, the UE may encode the payload of the first UCI1 into a jointly encoded message, and then split the jointly encoded message across the two TBs.

Scenario 1506 shows an example where a first UCI1 (e.g., an HP UCI) is repeated on both UCIs, while a second UCI2 (e.g., an LP UCI) is jointly encoded and mapped across both TBs. Scenario 1508 shows an example where a first UCI1 is jointly encoded and mapped across both TBs, while a second UCI2 is mapped to the second TB2. Scenario 1510 shows an example where a first UCI1 is mapped to the first TB1, and the second UCI2 is jointly encoded and mapped across both TBs. And scenario 1512 shows an example where both UCI1 and UCI2 are jointly encoded and mapped to both TBs. The selection of which mapping scheme to employ may depend on the priorities of the respective UCIs and may depend on resource availability for carrying the UCIs. In some examples, described below, at least a portion of the UCIs may be omitted from the TBs if UCI resources are insufficient to carry the complete UCIs.

The above discussion referred to a first TB1 and a second TB2. In various aspects of this disclosure, any of a variety of factors, or a combination of such factors, can be utilized to distinguish a first TB from a second TB for mapping purposes, including for example, the UCI priority index of the respective UCIs, the MCS of the respective TBs, the TB index, a redundancy version (RV) of the respective TBs, or a new data indicator (NDI) of the respective TBs, UCI resource availability, a number of layers of the respective TBs, or TB priority indices.

For example, a UE may map a plurality of UCIs to a plurality of TBs based on a different TB index of those TBs. For example, a high-priority UCI may be mapped to a lower TB index, while a low-priority UCI may be mapped to a higher TB index (or vice-versa). This is a simple mechanism utilizing already-existing TB indices used for ordering and sequencing TBs.

In another example, a UE may map UCIs to their corresponding TBs based on a different modulation and coding scheme (MCS) used for the respective TBs. For example, the UE may map a high-priority UCI to the TB that has a higher MCS (e.g., higher-order modulation, higher code rate, etc.) and may map a low-priority UCI to the TB that has a lower MCS, or vice-versa. In an example mapping a high-priority UCI to a TB with a lower MCS, this can provide for improved reliability in communication of the high-priority UCI.

In another example, a UE may map UCIs to their corresponding TBs based on a different new data indicator (NDI) associated with the respective TBs. For example, if two TBs are scheduled with different NDIs (i.e., one TB is a new transmission of a TB and another TB is a retransmission of a previously failed TB), then the UE may prioritize the TB with the NDI indicating new data, treating that TB as a first TB, and treating the TB with an NDI indicating a retransmission as a second TB.

In another example, a UE may map UCIs to their corresponding TBs based on a different redundancy version (RV) indicator associated with the respective TBs. For example, a UE may determine whether a TB is a first TB or a second TB according to a predefined RV order, e.g., RV0>RV2>RV3>RV1, or RV0>RV1>RV2>RV3, etc. For example, if two TBs are associated with RV2 and RV3, then the TB associated with RV2 may be the first TB and the TB associated with RV3 may be the second TB. In another example, the UE may determine that the TB with RV 0 is a first TB, and the TB associated with any other TB is a second TB.

In another example, a UE may map UCIs to their corresponding TBs based on a different number of layers of the respective TBs. For example, a UE may map a first UCI (e.g., a high-priority UCI) to the TB that has more (or fewer) layers, and may map a second UCI (e.g., a low-priority UCI) to the TB that has fewer (or more) layers. In some examples, the UE may select the TB with the smaller number of layers to carry the high-priority UCI, and the TB with the greater number of layers to carry the low-priority UCI. This is because with a smaller number of layers, the difference in channel quality among the respective layers may be smaller and thus the lesser-layer TB may provide more communication stability for a high-priority UCI.

In still another example, a UE may map UCIs to their corresponding TBs based on different TB priority indices. For example, a UE may map a first UCI (e.g., a high-priority UCI) to a high-priority TB, and map a second UCI (e.g., a low-priority UCI) to a low-priority TB (or vice-versa). In some instances, the UE may employ a rule only to map UCIs to TBs having the same or a corresponding priority index. For example, in a case with a high-priority TB and a low-priority TB, a UE may multiplex a high-priority UCI with the high-priority TB and may multiplex a low-priority UCI with a low-priority TB.

In another example, a UE may map UCIs to their corresponding TBs based on different UCI resource availability in the respective TBs. For example, a UE may identify a first TB (for mapping, e.g., a high-priority UCI) as the TB that has greater (or lesser) UCI resource availability. UCI resource availability can be based on the size of the TB and the alpha factor, described above, which sets an upper bound on the UCI resource availability in a TB. In this manner, for example, the likelihood that an entire high-priority UCI is multiplexed onto its corresponding TB without having any portions omitted (omission rule described below) can be improved.

In the above examples, a UE may map a plurality of UCIs to a plurality of TBs based on one or more suitable factors. For example, if a UE were mapping based on the MCS for the TBs, and both TBs utilize the same MCS, then the UE may utilize one or more other factors such as the number of layers of the TBs to order the TBs. Those of ordinary skill in the art will recognize that any combination of factors may be employed in this manner for mapping UCIs onto TBs. Moreover, a UE may apply the set of factors in any suitable order or sequence. For example, the ordering may be: TB priority index first, MCS second, number of layers third, and TB index fourth. In this example, a UE may first check the priority level of the two TBs. If the TBs have different priority, then the UE will follow the rule explained above for mapping UCIs based on the TB priority index. However, if the TBs have the same priority as one another, then the UE may second check the MCS of the two TBs. If the TBs have different MCS, then the UE will follow the rule explained above for mapping UCIs based on MCS. However, if the TBs have the same MCS, then the UE may third check the number of layers of the two TBs. If the TBs have different numbers of layers, then the UE will follow the rule explained above for mapping UCIs based on the number of layers. However, if the TBs have the same number of layers, then the UE may fourth check the TB indices and follow the rule explained above for mapping UCIs based on TB index. In another example, the ordering may be: TB priority index first, number of layers second, MCS third, and NDI fourth, RV fifth, and TB index sixth. Of course, any suitable ordering or sequence of any suitable combination of some or all the above-discussed factors may be utilized in a given implementation.

Furthermore, the mapping of UCIs may depend on the amount of UCI resources available on one or both TBs. For example, referring to FIG. 15, in scenario 1504, a high-priority UCI1 is repeated on both a first TB1 and a second TB2. In the illustrated example, a low-priority UCI2 is mapped to the second TB2. However, it may be the case that there are insufficient UCI resources available in TB2 for UCI2. Thus, the UE may map a portion of the second UCI2 to the second TB2 and may omit a portion of the second UCI2.

Similarly, in scenario 1506, a high-priority UCI1 is repeated on both TBs, and a low-priority UCI2 is mapped across both TBs jointly. In this case, the UE may map the low-priority UCI2 to the remaining resources on TB1 and TB2. For example, a portion of UCI2 may be allocated to remaining UCI resources in the first TB1 and a portion of UCI2 may be allocated to remaining UCI resources in the second TB2. However, it may occur that there are insufficient UCI resources available for UCI2 in TB1 and TB2. Thus, the UE may omit a portion of the second UCI2.

In further aspects of this disclosure, a UE may determine which portion of a UCI to omit based on UCI resource availability. For example, if insufficient UCI resources are available on a TB (or a set of TBs) to multiplex a given UCI, a UE may simply drop the UCI(s) with a lower priority. In another example, a UE may map a portion of the UCI to a TB and may omit or drop a portion of the UCI. In some aspects, a UE may employ CSI priority levels to identify which portion of a UCI to omit or drop.

In some wireless communication networks, as discussed above, a UCI may include various information types, such as but not limited to CSI reports, HARQ-ACK feedback, SR, etc. In some examples, a given UCI may include multiple information elements of these types. When a UCI includes a set of K CSI reports, a UE may rank the set of K CSI reports based on their priority level. Note that this CSI priority level differs from the UCI priority index and PUSCH priority index, discussed above. According to an aspect of the present disclosure, if the amount of UCI resources available for UCI multiplexing in a PUSCH is not sufficient to contain the full set of K CSI reports, then the UE may multiplex a subset K'<K CSI reports with the highest priority among the K CSI reports. Here, K' is such that K' CSI reports can be included in the PUSCH, but K'+1 CSI reports cannot be included in the PUSCH due to the limited resource availability. As discussed above, an upper bound of UCI resource availability in a PUSCH can be determined by employing a suitable alpha factor.

According to a further aspect of the disclosure, it may occur that a RAN node requests a UE to transmit an aperiodic CSI report (A-CSI) or a semi-persistent CSI report (SP-CSI) together with a PUSCH transmission. That is, a RAN node may provide a UL grant (or scheduling DCI) that schedules a PUSCH transmission and requests an A-CSI report or SP-CSI report. In some examples, the RAN node may indicate (e.g., via the UL grant, via a MAC-CE, via RRC signaling, or any other suitable control signaling) the priority of the associated A-CSI or SP-CSI. In other examples, the UE may employ a rule always to treat such A-CSI or SP-CSI requests as high-priority (or, in other examples, as low-priority).

Figure 16:
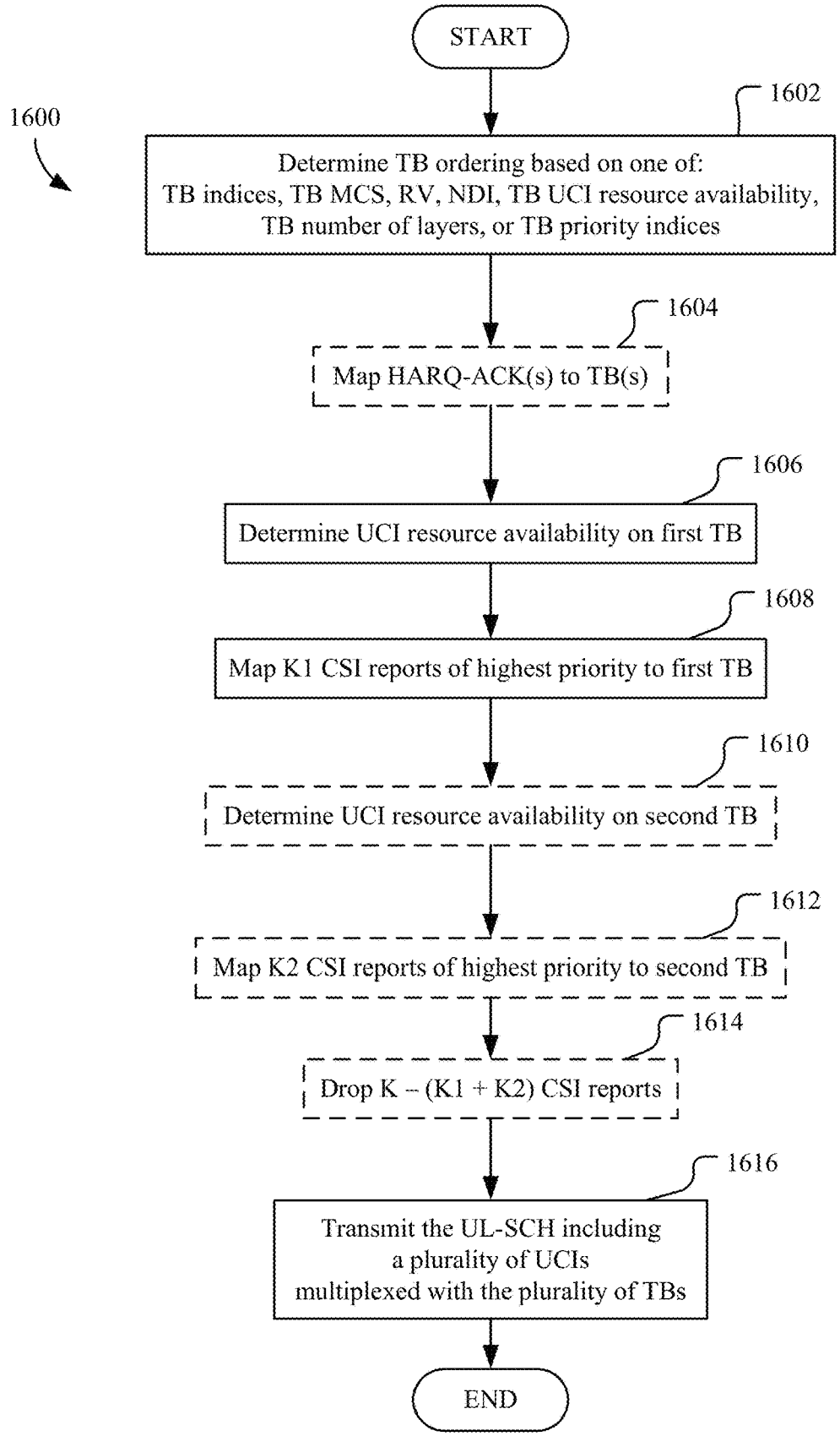
FIG. 16 is a flow chart illustrating an example of a process for channel state information (CSI) report omission in a multi-TB PUSCH transmission according to some aspects of this disclosure.

FIG. 16 is a flow chart illustrating an exemplary process 1600 for CSI report omission in a multi-TB PUSCH transmission in accordance with some aspects of the present disclosure. As described below, a particular implementation may omit some or all illustrated features and may not require some illustrated features to implement all embodiments. In some examples, the UE 700 illustrated in FIG. 7 may be configured to carry out the process 1600. In some examples, any suitable apparatus or means for carrying out the functions or algorithm described below may carry out the process 1600.

In the illustrated process 1600, a UE is scheduled for a 2-TB PUSCH transmission, and that UE has a set of UCIs (HARQ-ACK, CSI reports, SR, etc.) that it wishes to map to those TBs for transmission on the PUSCH. This set of UCIs includes a set of K CSI reports, each CSI report having a respective CSI priority associated with it.

At block 1602, a UE may determine a TB ordering or sequencing based on one of: TB indices, TB MCS, RV, NDI, TB UCI resource availability, TB number of layers, or TB priority indices, or some combination thereof. As described above, this TB ordering may be employed for determining a first TB for mapping a high-priority UCI and for determining a second TB for mapping a low-priority UCI.

At optional block 1604 the UE may map a set of HARQ-ACK(s) to one or both TBs. That is, in some examples, resources may be allocated for HARQ-ACK feedback prior to that for CSI reports, such that HARQ-ACK feedback may not be omitted from mapping to TBs. Some examples may include other UCI types such as scheduling requests (SR) in block 1604.

At block 1606 the UE may determine UCI resource availability on a first TB. For example, as described above, the UE may determine an upper bound of the amount of resources available for carrying a UCI, based on the total amount of resources on the first TB multiplied by a factor (alpha factor) that may be configured by RRC signaling.

At block 1608 the UE may map a set of K1 CSI reports to the first TB. Here, K1≤K is the largest number of CSI reports that can be contained in the first TB. In some examples, K1 may include the set of highest-priority CSI reports. That is, the UE may rank a set of K CSI reports in order of priority and map that subset K1 of highest-priority CSI reports, according to the ranking, such that the UCI resources for carrying K1 CSI reports (excluding those UCI resources already allocated for HARQ-ACK, etc. in block 1604) are not greater than the upper bound of UCI resource availability in that TB determined in block 1606. For example, K1+1 CSI reports would require an amount of UCI resources greater than the upper bound. In another example, K may be a portion of CSI reports having the same priority as the first TB. For example, the UE may map high-priority CSI reports to the first TB when the first TB is a high-priority TB.

At block 1610, if K1<K, such that there remain CSI reports to be transmitted, the UE may determine UCI resource availability on a second TB. For example, as described above, the UE may determine an upper bound of the amount of resources for carrying a UCI, based on the total amount of resources on the second TB multiplied by a factor (alpha factor) that may be configured by RRC signaling.

At block 1612, the UE may map a set of K2 remaining CSI reports to the second TB. Here, (K1+K2)≤K, such that K2 is the largest number of remaining CSI reports that can be contained in the second TB. In some examples, K2 may include the set of highest-priority remaining CSI reports. In other examples, K2 may be a portion of CSI reports having the same priority as the second TB. For example, the UE may map low-priority CSI reports to the second TB when the second TB is a low-priority TB. In general, the determination of K2 follows the principle described above for the determination of K1, i.e., fit as many of the highest-priority CSI reports as possible.

At block 1614, if there are any remaining CSI reports (i.e., if K−(K1+K2)>0), these remaining, lowest-priority CSI reports are dropped by the UE. And at block 1616, the UE may transmit (e.g., utilizing transceiver 710) the PUSCH including the UCIs mapped to the first and second TBs.

FIG. 17 is a flow chart illustrating an exemplary process 1700 for a PUSCH reception with multiple TBs in accordance with some aspects of the present disclosure. As described below, a particular implementation may omit some or all illustrated features and may not require some illustrated features to implement all embodiments. In some examples, the RAN node 600 illustrated in FIG. 6 may be configured to carry out the process 1700. In some examples, any suitable apparatus or means for carrying out the functions or algorithm described below may carry out the process 1700.

At block 1702, a RAN node 600 transmits (e.g., utilizing transceiver 610) an UL grant or UL scheduling DCI that includes a grant for a PUSCH transmission having a plurality of TBs. Here, each respective TB of the plurality of TBs is associated with a respective TB priority index. For example, scheduling circuitry 640 may generate scheduling information including a scheduling DCI. When each respective TB is associated with a respective TB priority index, a single PUSCH transmission can carry multiple TBs having different priorities.

At block 1704, the RAN node 600 receives the scheduled PUSCH including the plurality of TBs. For example, transceiver 610 may be used to receive the scheduled transmission from a UE, including TBs having a configured MCS, number of layers, etc.

Further Examples Having a Variety of Features

Example 1: A method, apparatus, and non-transitory computer-readable medium for receiving a UL grant comprising a grant for a PUSCH transmission comprising a plurality of TBs, each respective TB of the plurality of TBs being associated with a respective TB priority index; and transmitting the PUSCH including the plurality of TBs.

Example 2: A method, apparatus, and non-transitory computer-readable medium of Example 1, wherein at least two TBs of the plurality of TBs are associated with respective TB priority indices that differ from one another, and wherein the UL grant comprises a set of respective TB priority index indicators for indicating a corresponding TB priority index for each respective TB of the plurality of TBs.

Example 3: A method, apparatus, and non-transitory computer-readable medium of any of Examples 1-2, further comprising transmitting a plurality of UL control information (UCIs) multiplexed with the PUSCH.

Example 4: A method, apparatus, and non-transitory computer-readable medium of any of Examples 1-3, wherein the UL grant indicates a plurality of beta offsets, and further comprising encoding a first UCI of the plurality of UCIs at a first code rate based on a first beta offset of the plurality of beta offsets; and encoding a second UCI of the plurality of UCIs at a second code rate based on a second beta offset of the plurality of beta offsets.

Example 5: A method, apparatus, and non-transitory computer-readable medium of any of Examples 1-3, wherein the UL grant indicates a beta offset, and further comprising encoding a first UCI of the plurality of UCIs at a first code rate based on the beta offset; and encoding a second UCI of the plurality of UCIs at a second code rate based on the beta offset.

Example 6: A method, apparatus, and non-transitory computer-readable medium of any of Examples 1-5, further comprising receiving an alpha parameter; and determining, based on the alpha parameter, an upper bound of an amount of resources for carrying control information on each respective TB of the plurality of TBs.

Example 7: A method, apparatus, and non-transitory computer-readable medium of any of Examples 1-5, further comprising receiving a plurality of alpha parameters corresponding to the plurality of TBs; and determining a respective upper bound of an amount of resources for carrying control information on each respective TB of the plurality of TBs based on a respective alpha parameter of the plurality of alpha parameters.

Example 8: A method, apparatus, and non-transitory computer-readable medium of any of Examples 1-7, wherein each UCI of the plurality of UCIs is associated with a respective UCI priority index.

Example 9: A method, apparatus, and non-transitory computer-readable medium of any of Examples 1-8, further comprising mapping a first set of one or more UCIs of the plurality of UCIs to a first TB of the plurality of TBs; and mapping a second set of one or more UCIs of the plurality of UCIs to a second TB of the plurality of TBs, wherein the first TB comprises at least one of: a different TB priority index than the second TB; a different TB index than the second TB; a different redundancy version than the second TB; a different new data indicator than the second TB; a different modulation and coding scheme (MCS) than the second TB; a different amount of UCI resource availability than the second TB; or a different number of layers than the second TB.

Example 10: A method, apparatus, and non-transitory computer-readable medium of any of Examples 1-9, wherein: the plurality of UCIs comprises a plurality of channel state information (CSI) reports, each respective CSI report of the plurality of CSI reports having a respective CSI report priority index; the first set of one or more UCIs comprises a first set of one or more CSI reports of the plurality of CSI reports; the second set of one or more UCIs comprises a second set of one or more CSI reports of the plurality of CSI reports; and each respective CSI report of the first set of one or more CSI reports having a higher CSI report priority index than each respective CSI report of the second set of one or more CSI reports.

Example 11: A method, apparatus, and non-transitory computer-readable medium of any of Examples 1-10, wherein the mapping the first set of one or more UCIs to the first TB, further comprises determining a number of the first set of one or more CSI reports based on: an upper bound of an amount of resources for carrying control information on the first TB; and a respective size of each respective CSI report of the plurality of CSI reports.

Example 12: A method, apparatus, and non-transitory computer-readable medium of any of Examples 1-11, further comprising forgoing to transmit at least one CSI report having a lower CSI report priority index than each respective CSI report of the second set of one or more CSI reports.

Example 13: A method, apparatus, and non-transitory computer-readable medium of any of Examples 1-11, further comprising determining a first amount of resources available on the first TB for carrying the UCIs, and a second amount of resources available on the second TB for carrying the UCIs; and forgoing to transmit at least one CSI report of the plurality of CSI reports when the first amount of resources and the second amount of resources are insufficient to contain the at least one CSI report, wherein the at least one CSI report has a lower CSI report priority index than each CSI report of the second set of one or more CSI reports.

Example 14: A method, apparatus, and non-transitory computer-readable medium of any of Examples 1-13, further comprising receiving a mapping indication for indicating whether to map the plurality of UCIs to one TB of the plurality of TBs, or to more than one TB of the plurality of TBs.

Example 15: A method, apparatus, and non-transitory computer-readable medium of any of Examples 1-14, further comprising mapping a first UCI of the plurality of UCIs to a first TB of the plurality of TBs, and mapping a second UCI of the plurality of UCIs to a second TB of the plurality of TBs, wherein the first TB has the same priority as the second TB.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes certain aspects and examples with reference to some illustrations, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes, and constitution.

By way of example, various aspects of this disclosure may be implemented within systems defined by 3GPP, such as fifth-generation New Radio (5G NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The present disclosure uses the terms "coupled" and/or "communicatively coupled" to refer to a direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

Applicant provides this description to enable any person skilled in the art to practice the various aspects described herein. Those skilled in the art will readily recognize various modifications to these aspects and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication, comprising:
one or more processors;
a memory; and
a transceiver coupled to the processor,
wherein the one or more processors are coupled to the memory and are configured to cause the apparatus to:
receive, via the transceiver, an uplink (UL) grant comprising a grant for a physical uplink shared channel (PUSCH) transmission comprising a plurality of transport blocks (TBs), each respective TB of the plurality of TBs being associated with a respective TB priority index;
transmit, via the transceiver, the PUSCH including the plurality of TBs; and
transmit, via the transceiver, a plurality of UL control information (UCIs) multiplexed in the plurality of TBs in the PUSCH, wherein the plurality of UCIs are multiplexed in the plurality of TBs based on one of:
respective modulation and coding schemes of the plurality of TBs,
respective UCI resource availability on the plurality of TBs, or
respective numbers of layers of the plurality of TBs.

2. The apparatus of claim 1,
wherein at least two TBs of the plurality of TBs are associated with respective TB priority indices that differ from one another, and
wherein the UL grant comprises a set of respective TB priority index indicators for indicating a corresponding TB priority index for each respective TB of the plurality of TBs.

3. The apparatus of claim 1, wherein the UL grant indicates a plurality of beta offsets, and
wherein the one or more processors are further configured to cause the apparatus to:
encode a first UCI of the plurality of UCIs at a first code rate based on a first beta offset of the plurality of beta offsets; and
encode a second UCI of the plurality of UCIs at a second code rate based on a second beta offset of the plurality of beta offsets.

4. The apparatus of claim 1,
wherein the UL grant indicates a beta offset, and
wherein the one or more processors are further configured to cause the apparatus to:
encode a first UCI of the plurality of UCIs at a first code rate based on the beta offset; and
encode a second UCI of the plurality of UCIs at a second code rate based on the beta offset.

5. The apparatus of claim 1, wherein the one or more processors are further configured to cause the apparatus to:
receive an alpha parameter via the transceiver; and
determine, based on the alpha parameter, an upper bound of an amount of resources for carrying control information on each respective TB of the plurality of TBs.

6. The apparatus of claim 1, wherein the one or more processors are further configured to cause the apparatus to:
receive, via the transceiver, a plurality of alpha parameters corresponding to the plurality of TBs; and
determine a respective upper bound of an amount of resources for carrying control information on each respective TB of the plurality of TBs based on a respective alpha parameter of the plurality of alpha parameters.

7. The apparatus of claim 1, wherein each UCI of the plurality of UCIs is associated with a respective UCI priority index.

8. The apparatus of claim 7, wherein the one or more processors are further configured to cause the apparatus to:
map a first set of one or more UCIs of the plurality of UCIs to a first TB of the plurality of TBs; and
map a second set of one or more UCIs of the plurality of UCIs to a second TB of the plurality of TBs,
wherein the first TB comprises at least one of:
a different TB priority index than the second TB;
a different TB index than the second TB;
a different redundancy version than the second TB;
a different new data indicator than the second TB;
a different modulation and coding scheme (MCS) than the second TB;
a different amount of UCI resource availability than the second TB; or
a different number of layers than the second TB.

9. The apparatus of claim 8, wherein:
the plurality of UCIs comprises a plurality of channel state information (CSI) reports, each respective CSI report of the plurality of CSI reports having a respective CSI report priority index;
the first set of one or more UCIs comprises a first set of one or more CSI reports of the plurality of CSI reports;
the second set of one or more UCIs comprises a second set of one or more CSI reports of the plurality of CSI reports; and
each respective CSI report of the first set of one or more CSI reports having a higher CSI report priority index than each respective CSI report of the second set of one or more CSI reports.

10. The apparatus of claim 9, wherein the one or more processors, being configured to map the first set of one or more UCIs to the first TB, are further configured to cause the apparatus to determine a number of the first set of one or more CSI reports based on:
an upper bound of an amount of resources for carrying control information on the first TB; and
a respective size of each respective CSI report of the plurality of CSI reports.

11. The apparatus of claim 9, wherein the one or more processors are further configured to cause the apparatus to:
forgo to transmit at least one CSI report having a lower CSI report priority index than each respective CSI report of the second set of one or more CSI reports.

12. The apparatus of claim 9, wherein the one or more processors are further configured to cause the apparatus to:
determine a first amount of resources available on the first TB for carrying the UCIs, and a second amount of resources available on the second TB for carrying the UCIs; and
forgo to transmit at least one CSI report of the plurality of CSI reports when the first amount of resources and the second amount of resources are insufficient to contain the at least one CSI report,
wherein the at least one CSI report has a lower CSI report priority index than each CSI report of the second set of one or more CSI reports.

13. The apparatus of claim 1, wherein the one or more processors are further configured to cause the apparatus to:
receive, via the transceiver, a mapping indication for indicating whether to map the plurality of UCIs to one TB of the plurality of TBs, or to more than one TB of the plurality of TBs.

14. The apparatus of claim 1, wherein the one or more processors are further configured to cause the apparatus to:
map a first UCI of the plurality of UCIs to a first TB of the plurality of TBs, and
map a second UCI of the plurality of UCIs to a second TB of the plurality of TBs,
wherein the first TB has the same priority as the second TB.

15. A method of wireless communication, comprising:
receiving an uplink (UL) grant comprising a grant for a physical uplink shared channel (PUSCH) transmission comprising a plurality of transport blocks (TBs), each respective TB of the plurality of TBs being associated with a respective TB priority index;
transmitting the PUSCH including the plurality of TBs; and
transmitting a plurality of UL control information (UCIs) multiplexed in the plurality of TBs in the PUSCH, wherein the plurality of UCIs are multiplexed in the plurality of TBs based on one of:
respective modulation and coding schemes of the plurality of TBs,
respective UCI resource availability on the plurality of TBs, or
respective numbers of layers of the plurality of TBs.

16. The method of claim 15,
wherein at least two TBs of the plurality of TBs are associated with respective TB priority indices that differ from one another, and
wherein the UL grant comprises a set of respective TB priority index indicators for indicating a corresponding TB priority index for each respective TB of the plurality of TBs.

17. The method of claim 15, wherein the UL grant indicates a plurality of beta offsets,
the method further comprising:
encoding a first UCI of the plurality of UCIs at a first code rate based on a first beta offset of the plurality of beta offsets; and
encoding a second UCI of the plurality of UCIs at a second code rate based on a second beta offset of the plurality of beta offsets.

18. The method of claim 15,
wherein the UL grant indicates a beta offset,
the method further comprising:
encoding a first UCI of the plurality of UCIs at a first code rate based on the beta offset; and
encoding a second UCI of the plurality of UCIs at a second code rate based on the beta offset.

19. The method of claim 15, further comprising:
receiving an alpha parameter; and
determining, based on the alpha parameter, an upper bound of an amount of resources for carrying control information on each respective TB of the plurality of TBs.

20. The method of claim 15, further comprising:
receiving a plurality of alpha parameters corresponding to the plurality of TBs; and
determining a respective upper bound of an amount of resources for carrying control information on each respective TB of the plurality of TBs based on a respective alpha parameter of the plurality of alpha parameters.

21. The method of claim 15, wherein each UCI of the plurality of UCIs is associated with a respective UCI priority index.

22. The method of claim 21, further comprising:
mapping a first set of one or more UCIs of the plurality of UCIs to a first TB of the plurality of TBs; and
mapping a second set of one or more UCIs of the plurality of UCIs to a second TB of the plurality of TBs,
wherein the first TB comprises at least one of:
a different TB priority index than the second TB;
a different TB index than the second TB;
a different redundancy version than the second TB;
a different new data indicator than the second TB;
a different modulation and coding scheme (MCS) than the second TB;
a different amount of UCI resource availability than the second TB; or
a different number of layers than the second TB.

23. The method of claim 22, wherein:
the plurality of UCIs comprises a plurality of channel state information (CSI) reports, each respective CSI report of the plurality of CSI reports having a respective CSI report priority index;
the first set of one or more UCIs comprises a first set of one or more CSI reports of the plurality of CSI reports;
the second set of one or more UCIs comprises a second set of one or more CSI reports of the plurality of CSI reports; and
each respective CSI report of the first set of one or more CSI reports having a higher CSI report priority index than each respective CSI report of the second set of one or more CSI reports.

24. The method of claim 23, wherein the mapping the first set of one or more UCIs to the first TB comprises determining a number of the first set of one or more CSI reports based on:
an upper bound of an amount of resources for carrying control information on the first TB; and
a respective size of each respective CSI report of the plurality of CSI reports.

25. The method of claim 23, further comprising:
forgoing to transmit at least one CSI report having a lower CSI report priority index than each respective CSI report of the second set of one or more CSI reports.

26. The method of claim 23, further comprising:
determining a first amount of resources available on the first TB for carrying the UCIs, and a second amount of resources available on the second TB for carrying the UCIs; and
forgoing to transmit at least one CSI report of the plurality of CSI reports when the first amount of resources and the second amount of resources are insufficient to contain the at least one CSI report,
wherein the at least one CSI report has a lower CSI report priority index than each CSI report of the second set of one or more CSI reports.

27. The method of claim 15, further comprising:
receiving a mapping indication for indicating whether to map the plurality of UCIs to one TB of the plurality of TBs, or to more than one TB of the plurality of TBs.

28. The method of claim 15, further comprising:
mapping a first UCI of the plurality of UCIs to a first TB of the plurality of TBs, and
mapping a second UCI of the plurality of UCIs to a second TB of the plurality of TBs,
wherein the first TB has the same priority as the second TB.

29. An apparatus for wireless communication, comprising:
one or more processors;
a memory coupled to the processor; and
a transceiver coupled to the processor,
wherein the one or more processors are configured to cause the apparatus to:
transmit, via the transceiver, an uplink (UL) grant comprising a grant for a physical uplink shared channel (PUSCH) transmission comprising a plurality of transport blocks (TBs), each respective TB of the plurality of TBs being associated with a respective TB priority index;
receive, via the transceiver, the PUSCH including the plurality of TBs; and
receive, via the transceiver, a plurality of UL control information (UCIs) multiplexed in the plurality of TBs in the PUSCH, wherein the plurality of UCIs are multiplexed in the plurality of TBs based on one of:
respective modulation and coding schemes of the plurality of TBs,
respective UCI resource availability on the plurality of TBs, or
respective numbers of layers of the plurality of TBs.

30. A method of wireless communication, comprising:
transmitting an uplink (UL) grant comprising a grant for a physical uplink shared channel (PUSCH) transmission comprising a plurality of transport blocks (TBs), each respective TB of the plurality of TBs being associated with a respective TB priority index;

receiving the PUSCH including the plurality of TBs; and receiving a plurality of UL control information (UCIs) multiplexed in the plurality of TBs in the PUSCH, wherein the plurality of UCIs are multiplexed in the plurality of TBs based on one of:

respective modulation and coding schemes of the plurality of TBs, respective UCI resource availability on the plurality of TBs, or respective numbers of layers of the plurality of TBs.

\* \* \* \* \*